United States Patent [19]

Rickrode et al.

[11] 4,254,663
[45] Mar. 10, 1981

[54] METHOD AND APPARATUS FOR PRESSING WHEELS AND OTHER MEMBERS ONTO AND OFF OF AN AXLE

[75] Inventors: Jack A. Rickrode; Charles W. Frame, both of Chambersburg, Pa.

[73] Assignee: Chambersburg Engineering Company, Chambersburg, Pa.

[21] Appl. No.: 96,804

[22] Filed: Nov. 23, 1979

Related U.S. Application Data

[62] Division of Ser. No. 971,058, Dec. 19, 1978, Pat. No. 4,214,363.

[51] Int. Cl.$^3$ .............................................. G01L 7/16
[52] U.S. Cl. ......................................... 73/714; 73/744
[58] Field of Search ................ 73/714, 744, 745, 746, 73/701

[56] References Cited

U.S. PATENT DOCUMENTS

| | | | |
|---|---|---|---|
| 3,350,931 | 11/1967 | Johnson et al. | 73/701 |
| 3,350,932 | 11/1967 | Kirby et al. | 73/701 |
| 3,386,285 | 6/1968 | Kirby | 73/701 |
| 3,442,134 | 5/1969 | Bennett et al. | 73/745 |

*Primary Examiner*—Donald O. Woodiel
*Attorney, Agent, or Firm*—John C. Dorfman

[57] ABSTRACT

Opposing hydraulic rams are supported in cylinders on cylinder beams connected together and then connected with a intermediate resistance beam by low yield connection bars, thereby reducing shearing stresses at the foundation. Hydraulic controls operate rams in the first mode to clamp an axle between opposing rams or to release a clamped axle. In one driving mode one ram drives the clamped axle, which, in turn, drives the other ram axially in one direction. In the other driving mode the other ram drives the one in the opposite direction. In demounting members, the resistance beam or extensions bear against a member pressed onto the axle to restrain such member as the axle continues to move through until the member is loosened. In mounting members, opposition to axial movement of such a member loosely on the axle or ram extensions is provided by a yoke extension of the cylindrical beam to cause said members to be pressed onto the axle as the axle continues to move. The yoke extensions may be stationary and fixed in place or movable into position by various means. In every case, the yokes are backed up by the respective beams or other yoke extensions and the beams. Special hydraulic circuits enable selection of the various modes, elimination of waterhammer and of pressure recording. Monitoring movement of one ram by a suitable ram motion transducer enables recording of pressure vs. position.

3 Claims, 70 Drawing Figures

FIG. I

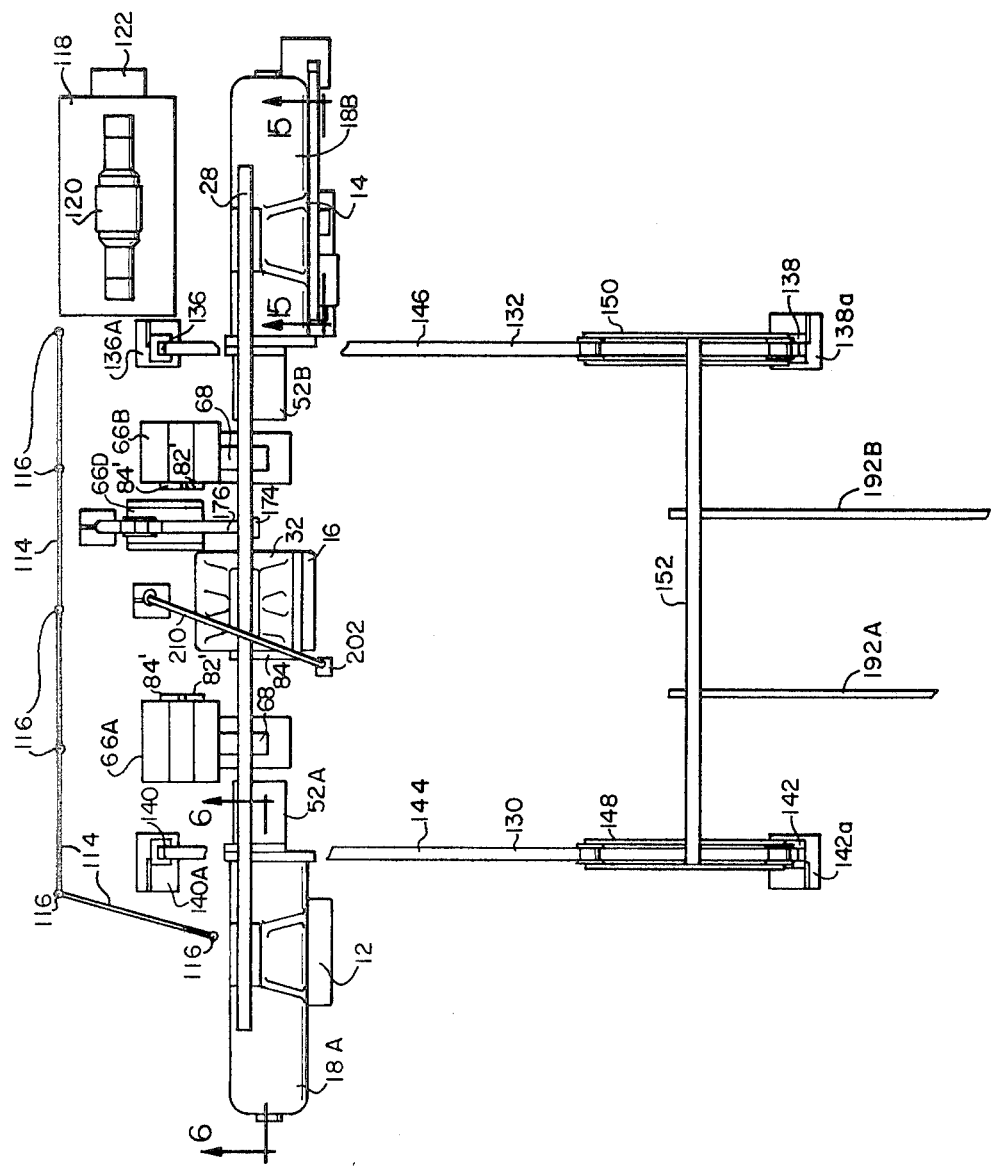

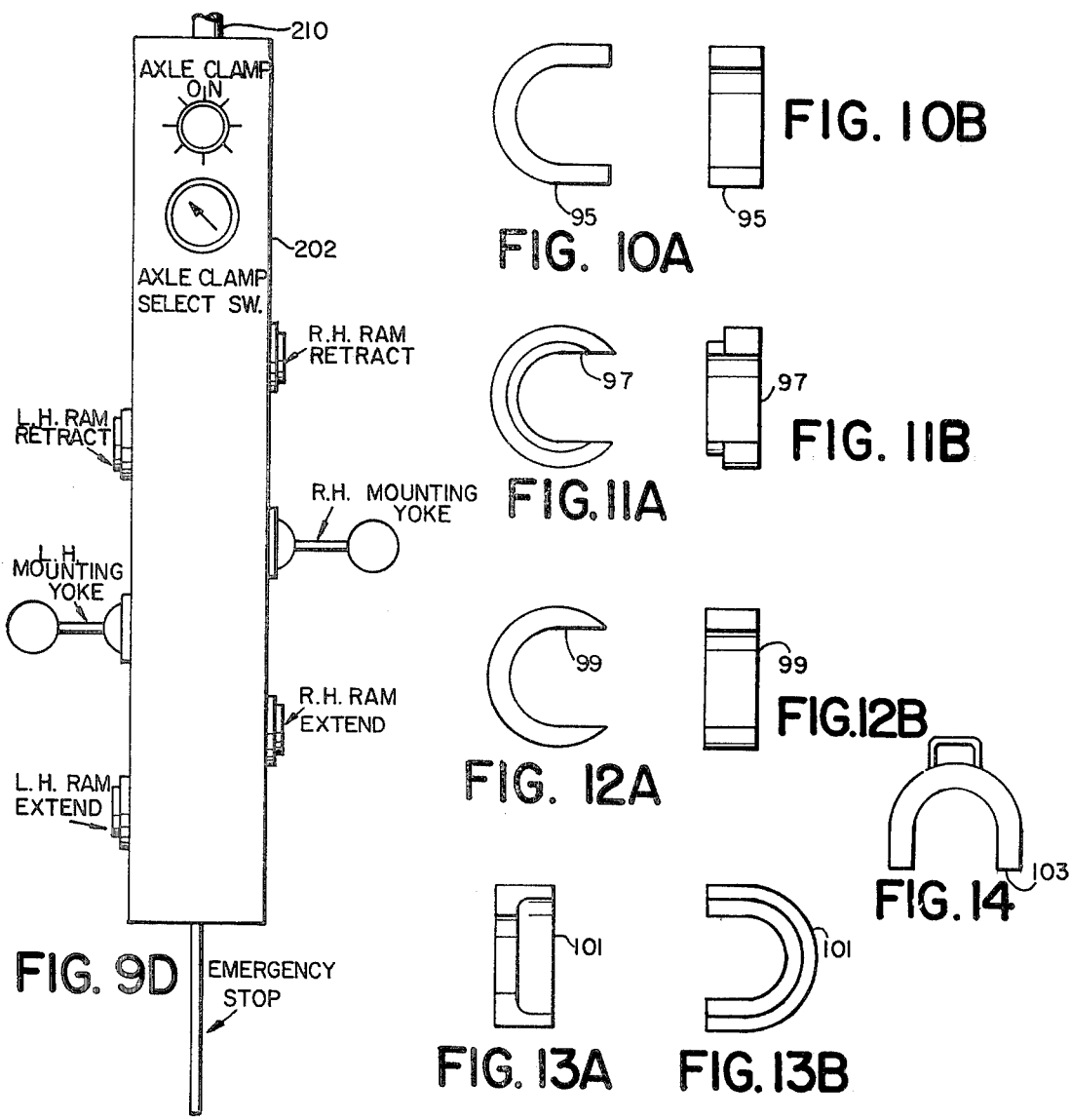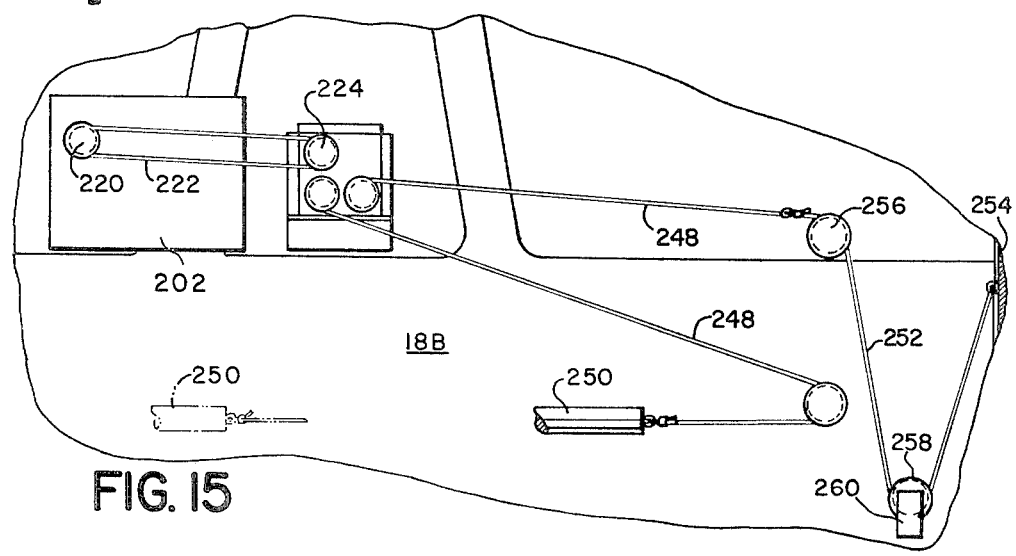

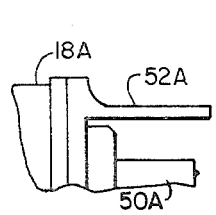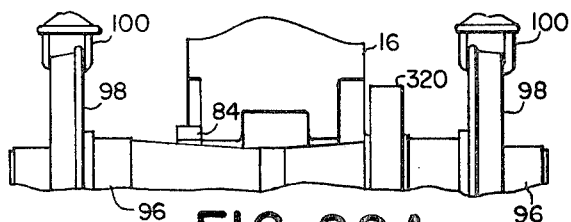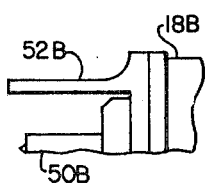
FIG. 22A
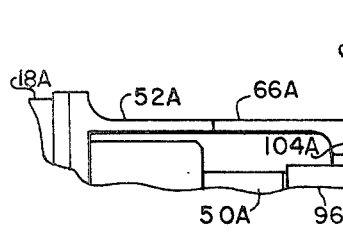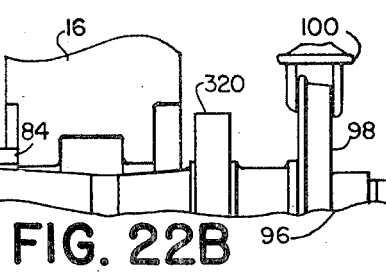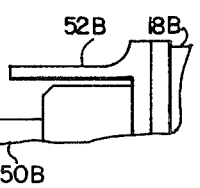
FIG. 22B
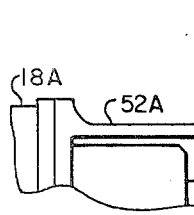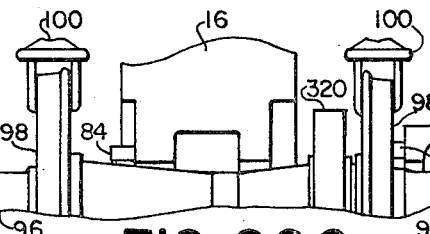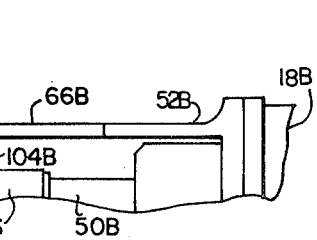
FIG. 22C
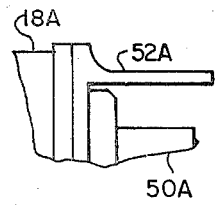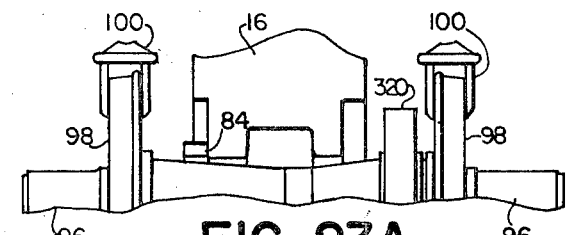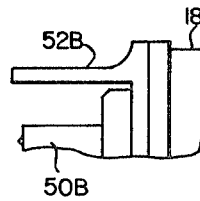
FIG. 23A
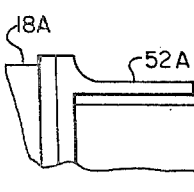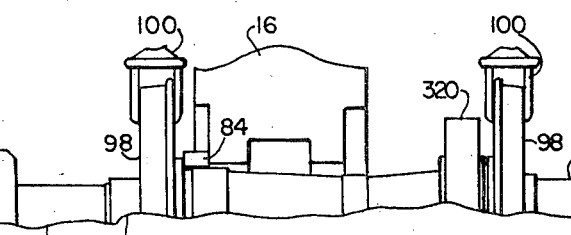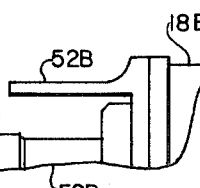
FIG. 23B

METHOD AND APPARATUS FOR PRESSING WHEELS AND OTHER MEMBERS ONTO AND OFF OF AN AXLE

This is a division of application Ser. No. 971,058, filed Dec. 19, 1978, now U.S. Pat. No. 4,214,363.

BACKGROUND OF THE INVENTION

The present invention relates to a novel press especially for railroad and heavy traction equipment application for mounting gears, wheels, bearings, and the like, onto or demounting the same from an axle.

Presses of the prior art for mounting bearings, wheels, and gears on seats provided for them on an axle or demounting them from said seats have typically employed opposing hydraulic rams which rigidly support ane axle between them. For example, a typical art press employed rigid support of the axle as illustrated in the patent to O. E. Rothfuchs et al, U.S. Pat. No. 2,906,012. Typically, in the prior art, if wheels, bearings and other parts were to be mounted onto an axle, they were mounted one at a time and sequentially in presses of various types employing hydraulic rams but moving the parts from station to station. U.S. Pat. Nos. 3,050,837 and 3,189,985, to J. W. Reed et al and Hoffman, respectively, illustrate systems in which each wheel is handled separately in a sequence of steps which may involve movement of the wheel or the axle along an axially oriented production line from one station to another. The movements were regulated by limit switches which sensed the position of the wheel and axle at a series of critical points as each sequential step took place indicating when a part is in a predetermined position so that the next sequential step might take place.

Our prior invention embodied in our U.S. Pat. No. 3,916,499 represented a substantial step forward in hydraulic bearing mounting presses wherein the wheel sets were moved into place and opposing rams drove bearings onto the wheel sets from opposite ends of the shaft at the same time, thus counter balancing the pressures. In this particular system, it was desirable to keep the axle centered. Means was provided to keep causing drive of one ram to stop when the axle was driven off center until the other ram had caught up thereby tending to keep the bearing mounting process in step.

SUMMARY OF THE INVENTION

The present invention involves still further development in the field of hydraulic presses and the method of using these presses. The press of the present invention allows gears, wheels, bearings and any other structure which may be press fit onto an axle to be handled at a single station. In order to do this, the press not only has the clamping mode which engages the axle from opposite ends to support the axle during pressing operations, it has driving modes in which one ram or the other actually drives the clamped axle axially in the direction of its extension movement.

The present invention for the first time involves a central resistance beam which allows an axle to pass through but provides obstruction for larger diameter members on the axle. In demounting when the member press fit onto the axle encounters the resistance beam or its extensions, further axial movement of that member is prevented and, thus, the continuing axial movement of the axle relative to the member demounts that member from the axle. In some cases, it is the resistance beam itself; in other cases, it is an extension or yoke of the resistance beam, transmitting the forces from the member being stopped, through the resistance beam which enables the part to be removed from its seat. Various yokes and fixtures may be attached to the beam or moved into place automatically or manually to accomplish this purpose.

In similar fashion, the cylinder beams also provide resistance to axial movement of larger diameter members loosely supported on an axle either through stationary yokes attached to the cylinder, and normally remaining in place, or through movable yokes which may be brought into position to be backed up by the stationary yoke or some part of the cylinder beam. Then, as the axle continues to be driven axially toward the cylinder beam, the member abuts the yoke and is held against the axial movement, and thereby forced onto a seat prepared for it on the axle.

Such use of axial movement to mount or demount various larger diameter members from an axle at a single station solely by the axial movement of the axle constitutes an entirely new method having substantial advantages and capable of major time savings in handling the various operations. These advantages are facilitated by the construction of the press itself, including the cylinder beams and the resistance beam which provide the basic structure through which resistance to ram movement is provided. Yokes of various types are adapted for particular applications and designed to be easily and quickly moved into place and just as easily and quickly removed from position after processing. Each of these yokes in conbination with other structures is unique in that it serves a function not previously performed by any wheel press.

Extraordinary hydraulic forces may be employed because shear forces relative to the supporting foundation are minimized by the use of low yield bars rigidly interconnecting the various beam structures. These bars accept tension forces which are applied through the rams to the axle. The bars are oppositely arranged around the axle to balance out these forces and eliminate all but a relatively small amount of linear movement between the beams, thereby producing only small shear forces at the foundation. These forces can be accomodated by conventional shear pads which do not require special design to accept high shear imposed by hydraulic forces for up to 600 tons in certain applications.

In order to provide a press which performs in the manner described, it is necessary to provide novel controls and primarily hydraulic systems which are capable not only of driving the rams toward each other and away from each other but driving one ram toward the other and allowing the other to yield while at the same time maintaining the clamping force. Alternative arrangements have to be able to produce such movement in opposite directions.

Furthermore, the hydraulic system of the present invention must be capable of measuring the differential effective hydraulic pressures produced. It is also highly desirable with such great pressure to be able to reliev the transient shock forces that produce "waterhammer". In accordance with the present invention, hydraulic systems are provided for both purposes.

The present invention provides the only press that can mount and demount while supporting the work with the same rams that generate the force required in mounting and demounting.

It is the only press that mounts and demounts exclusivelly by pushing the axle through the outer-member.

Because the press uses the axle clamp feature, whenever a ram extends, by definition the opposite ram exerts a counter force, otherwise the axle may fall. Consequently, the differential gauge arrangement, described hereafter in connection with FIG. 18, is necessary. In effect, this arrangement subtracts the pressure of the reetracting ram cylinder from the pressure of the extending ram cylinder. Hence, the pressure communicating with the recording gauge repressents only that pressure generated by the wheel fit. This being a strict requirement of the American Association of Railroads.

This is the only press whereby the work (axle) is held precisely in alignment with rams and fixtures that bearings can be mounted. No other press has this feature.

The present invention also provides a unique recording guage system which allows recordation of pressure changes to be plotted relative to ram position changes, thus, providing a continuous graph of pressure effects for different axial positions. The system requires monitoring interlocks to determine when the system is to be operative and in which direction in order to provide useful information.

It is noted that the press is especially constructed and useful in the mounting and demounting of wheels from diesel locomotive type wheel sets with the use of special adapters. So-called "Hy-Liner" wheel sets may also be handled. Standard freight and passanger car wheel sets are also easily handled.

In accordance with the present invention, therefore, an improved hydraulic press for mounting a large diameter member onto an axle by press fit, or demounting such a member from an axle is provided. The press has certain conventional features such as spaced apart and oppositely directed hydraulic cylinders containing axially aligned rams. A supply of incompressible fluid as usual requires means to connect and feed fluid between said supply and the cylinders. Control means controls flow of fluid to and from said cylinders in order to selectively drive each ram toward the other and to retract said rams.

The improvement includes at least two tension tie means located on opposite sides of the rams connecting the cylinders mechanically together in order to accept, distribute and balance tension forces generated by action of at least one of the rams tending to drive the cylinders apart. Preferrably, there are two tension tie members generally parallel to the ram, employed above and below the rams, and these tie members are preferably low yield metal bars permitting a predetermined amount of stretch. Preferably also the cylinders are part of cylinder beams which function to hold larger diameter members as an axle is moved to produce the press fit. The tie means are then connected between the cylinder beams. At least one of the respective cylinder beams is supported on a shear pad to accommodate slight amount of lateral movement due to elongation of the tension tie members.

In accordance with preferred form of the present invention, in order to permit demounting of larger members as well as their mounting, a resistance beam is located between the cylinder beams along the axial path between the rams and connected to the tension means in such a manner as to accept and transmit tension tending to drive any two and three connected beam members apart. The resistance beam is shaped to permit passage of an axle but provides an intermediate structural obstacle opposing movement of larger diameter pieces when an axle held between the rams is moved axially.

Also, preferably in accordance with the present invention, various yokes are useful in connection with the various beams. These yokes are movable into position against a beam or against other yokes cooperating with a beam or extensions of a beam by variety of techniques.

The improved hydraulic techniques of the present invention includes a pressure gauge having fluid pressure transmitting lines from the ram driving cylinders into a valve which is responsive to means sensitive to pressure differential to cause always connection of the high pressure to a particular high pressure output port. Lines connect the high and low pressure output ports of the valve to a differential cylinder to position its piston. The differential cylinder has at least an output piston rod which is connected, in turn, to drive the piston of a differential pump whose output pressure on the high pressure sides is proportioned to the differential pressure.

Preferably, the pressure that is recorded is used in a gauge of a recording variety which includes mechanical reference means attached to one of the rams to move with the ram. A linear flexible connector is connected between said means and a fixed point on the frame over path defining means including at least one direction changing element affixed to th frame. The linear connector includes slack storage means between the fixed position and the at least one direction changing means to keep the linear connector taut. A linear movement monitoring device along said path is in contact with and driven by said linear connector. The monitoring device includes separate rotary elements driven by the linear connector through separate direction clutch means which are responsive to transmit motion only in one direction, respectively in opposite direction. A recording gauge has one directional drive member responsive to said separate rotatary element with a direction changing means between one of the rotary means and the directional drive member whereby each of the rotary elements drives the recording gauge in the same direction. Means is provided to disengage the driving connection except for times selected for recording.

In each instance a hydraulic control circuit for the hydraulic press of the type described includes means to connect selectively and feed fluid from a fluid supply to each cylinder to drive and retract each ram. Each cylinder has a cylinder supply control valve having alternate positions capable of connecting pressure to either end of the cylinder while venting to tank the other end of the cylinder and a third position cutting off the cylinder from pressure. A mode selection system includes a mode control valve capable of selectively connecting pressure to either one of the two cylinder supply control valves or to neither of them. Means is required to coordinate valve movements to provide proper combination of valve positions to effect axle clamp or release, drive right or drive left, or no movement. Preferably, pressures supplied through the mode selection control valve are higher than those through the supply directly through the cylinder supply control valve. This pressure differential may be the result of pressure reduction means in lines leading to the cylinder selection control valves.

Preferably, each of the control valves in such a hydraulic system is a spoool valve having a spring loaded off position and open positions to connect pressure and vent to tank lines to opposite ends of the cylinders in the cylinder supply valves. Greater pressure is provided to one cylinder control valve or the other through the mode control valve in the axial drive modes.

Preferably, the spool valves are pilot fluid pressure controlled and actuated in the selected positions by pilot lines to the opposite ends of the spool valves whereby pressure applied will drive the control valve from a central neutral position to a selected position to move the ram in a selected direction. Preferably, the pilot lines are supplied pilot pressure or vented to tank by a pilot selection valve which by its positioning selects the direction of movement of the ram in the cylinder by determining the position of the control valve. The pilot valve in a preferred embodiment is also a solenoid control spool valve such that solenoid means determines the position of the spool to control pressure through the pilot valve to actuate the control valve.

The method of the present invention broadly involves the concept of clamping an axle with large diameter members to be mounted or demounted on it between the rams of a press of the present invention. The member on the axle is then moved against one of the beams of the press which thereafter holds it from further movement. The axle is continued to be moved. In most instances, where the resistance beam, or an extension yoke, is involved, the action is to remove the member from the axle, whether it be wheel, gear or bearing. Where one of the cylinder beams, or an extension thereof, is involved, against which the member is moved, the action is to press the member into place on its seat on the axle. Whichever type of operation is undertaken, when it is complete the axle is returned to its center position and the axle clamp released. Preferably means is used to convey the axle assembly to the press and to convey it away from the press. Various steps may be involved in interposing extensions or yokes to the various beams in order to permit force to be applied in the desired direction.

BRIEF DESCRIPTION OF FIGURES

For a better understanding of the present invention reference is made to the accompanying drawings in which:

FIG. 3 is a plan view on a smaller scale than FIG. 1 from above the apparatus of FIGS. 1 and 2 with some of the crane structure broken away;

FIG. 9D is a similar enlarged view of the press pendant station;

FIGS. 10A and 10B are side and open end views of a special adapter yoke;

FIGS. 11A and 11B are side and open end views of a resistance beam cap adapter;

FIGS. 12A and 12B are side and open end views of a C-shaped yoke adapter;

FIGS. 13A and 13B are side and open end views of a mounting yoke adapter;

FIG. 14 is a side view of a bearing demounting collar;

FIG. 15 is an enlarged partial view of a clutch controlled pressure recording gauge unit used with the present invention viewed along line 15—15 of FIG. 3;

FIGS. 22A, 22B and 22C are similar schematic diagrams showing steps in wheel mounting procedure;

FIGS. 23A, 23B, 23C and 23D are similar schematic diagrams of wheel demounting procedure;

DESCRIPTION OF THE SPECIFIC EMBODIMENT

Figure 1:
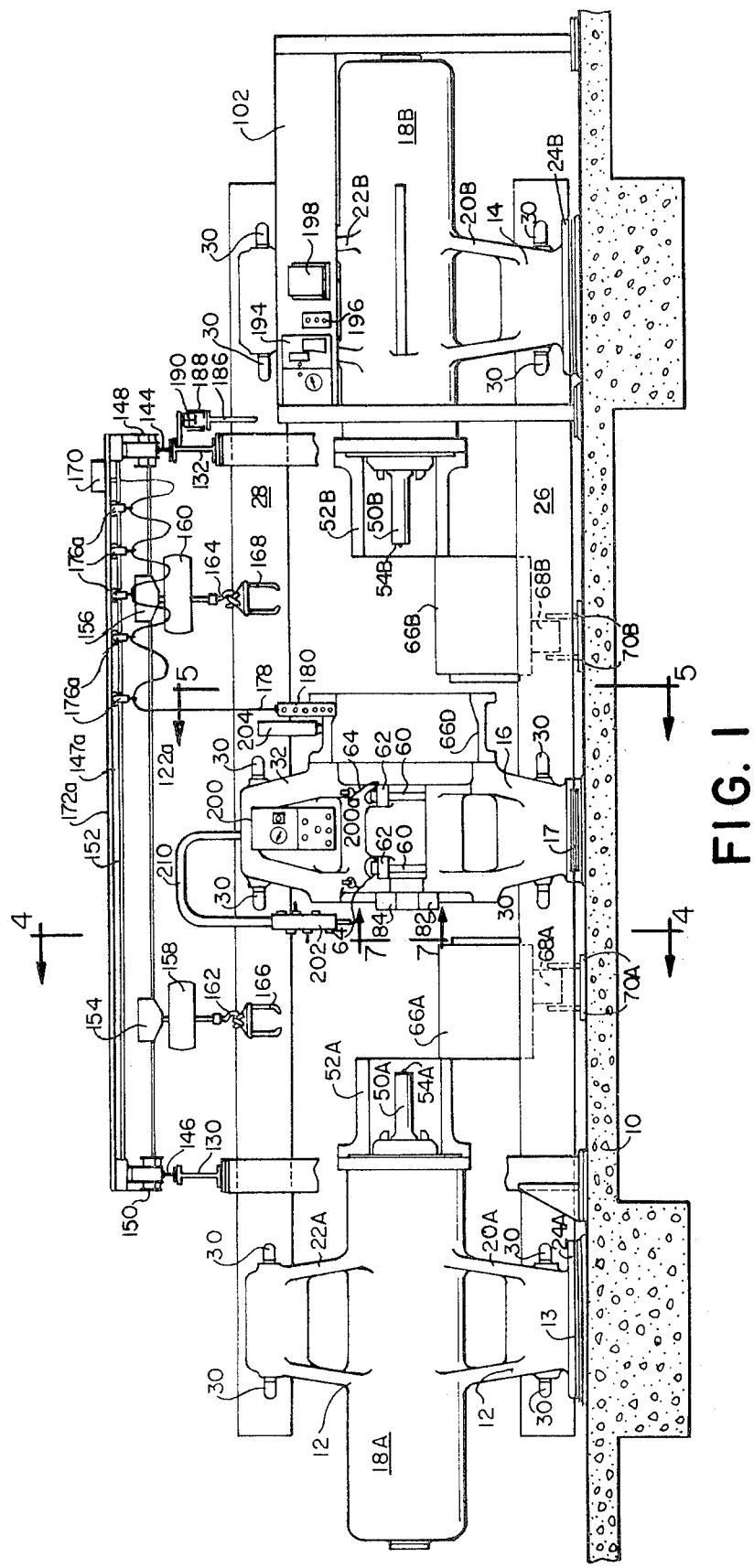
FIG. 1 is a front elevational view of the wheel press of the present invention with part of the crane structure broken away to provide better visability of the press itself.

Reference to FIGS. 1, 2, 3 and 4, will give an impression of the overall mechanical structure of the present invention. A reinforced concrete base 10 supports opposed cylinder beams 12 and 14 and a resistance beam 16. Each of these beam structures is cast in high strength ductile iron. Each of these beam structures is bolted through a suitable flange fitting to a special prepared foundation 10 capable of accepting the weight of the structure and a small amount of shear force. Cylinder beam 14 is bolted directly to the floor but each of the other beams is preferably separated from the foundation by a resilent shear pad. Each of the cylinder beams 12 and 14 supports a cylinder, cylinders 18A and 18B, respectively of essentially the same construction but reversed orientation. Each cylinder beam has a pedestal portion 20A and 20B and a superstucture 22A and 22B. Pedestals 20A and 20B are terminated in flanged foot portions 24A and 24B through which bolts extend and provide attachment to the foundation. Because of the extraordinary forces experienced by the equipment, rectangular rolled steel tension bars 26 and 28 are arranged on opposite sides of the cylinders. These tension bars are proportioned to limit stretch, at the maximum 600 tons, to less than 0.005 inch per foot. Here, they are arranged with tension bar 26 below and somewhat forward of the press axis and tension bar 28 above the cylinders and correspondingly behind the axis and symmetrically arranged to provide a balance of forces. The tension bars extend from one cylinder to the other. Tension bar 26 is attached to the base or pedestal structure 20A of cylinder 18A and the pedestal structure 20B of cylinder 18B using similar forged steel keys 30. Tension bars 26 and 28 are also attached to resistance beam 16 at its base and superstructure, respectively, by similar forged steel keys 30.

The tension bars are prestressed about the cylinder beams at 20 and 22 and at the resistance beam 16 and 32. The keys 30 on either side of each beam make the press a rigid structure and assures the maintenance of precise alignment.

The tension bars function as reactive elements to distribute the forces applied in the press between the cylinders and the resistance beam so that these forces to a large extent appear as tensional forces in the tension bars rather than as stress forces tending to shear cylinder support structures and the resistance beam away from the reinforced concrete support base 10. The bolts and other structure holding the cylinder and resistance beams in place are thus subjected to relatively small shearing forces. The support base of cylinder beam 14 is bolted directly to the foundation, but the bases of cylinder beam 12 and resistance beam 16 are supported on shear pads 13 and 17, respectively, to accommodate the small shear forces remaining. The weight of these beam structures plus the weight of materials being handled and dynamic forces are accommodated by the foundation 10 which is designed for that purpose.

Figure 6:
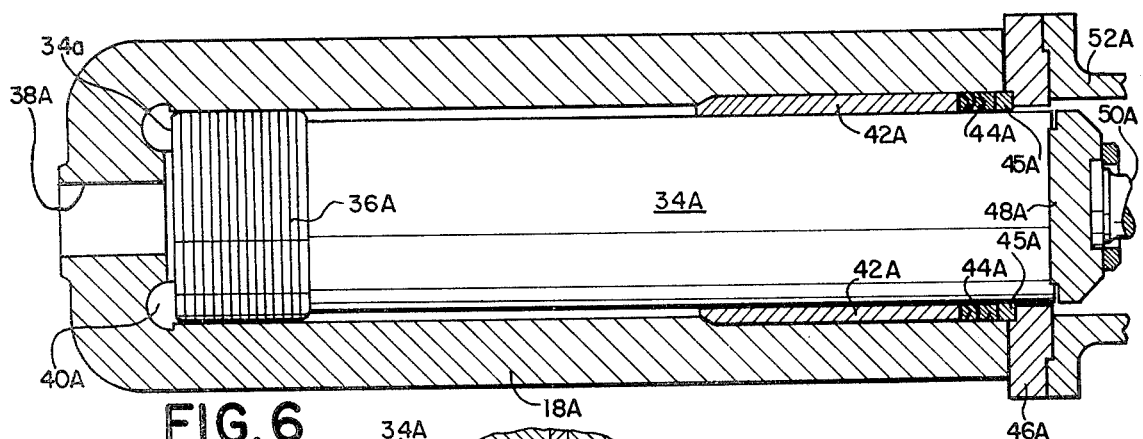
FIG. 6 is an enlarged sectional view taken along line 6—6 of FIG. 3 of one of the hydraulic cylinders.

The internal structures of each cylinder is essentially identical. Cylinder 18A is shown in FIG. 6 which is a cross-sectional view taken along line 6—6 of FIG. 3. The cylinders, for example, have been made to accommodate 600 tons of force and provide a 36 inch stroke. The cylinder 18A is a deep cup-shaped structure containing a ram 34A with an integral piston 36A at the drive end. The piston 36A is filled with multiple piston rings. Hydraulic fluid is fed through large opening 38A by means of a large conduit in order to give rapid action and still maintain very high force effects. The fluid supply conduit is omitted in the drawings for the sake of clarity, but it will be understood that fluid enters the cylindrical chamber 40A behind the ram piston and applies pressure to the back end 34A to drive the ram out of the cylinder. The incompressible fluid being introduced must fill the large volume within the cylinder behind the piston as the ram advances while maintaining the pressure. A relatively smaller volume of fluid is vented to the tank from the front of the cylinder. The piston is withdrawn by the reverse process, by supplying fluid under pressure to the front of the cylinder and venting the back end of the cylinder to the fluid storage tank. The outer diameter of the ram piston rod is the same throughout its length. The diameter of the bore of the cylinder is larger toward its open end through which the ram extends to accommodate a throat bushing 42A and a chevron type gland packing 44A held in place by packing ring 45A and, in turn, by the ring 46A which has an inner diameter closely embracing the ram 34A. At its force applying end, the ram 34A is provided with a cap 48A and a ram extension 50A through which force is applied to an axle. Coaxially surrounding the ram structure and extending the cylinder is a tubular stationary mounting yoke 52A provided with an outwardly extending ring flange which is bolted or otherwise supported against the ring 46 on the cylinder 56. The yokes, like the cylinders, are ductile iron.

Figure 6A:
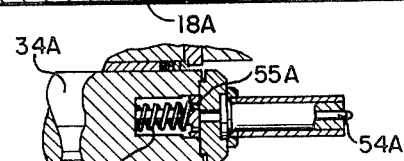
FIG. 6A is an axial section of the end ram shown in FIG. 6 to which the ram extension is attached showing the centering probe member.

It will be noted in passing that the structure of each of the cylinders 18A and 18B and their rams 34A and 34B is the same, but the orientation in the system is opposite. In FIG. 1 and the other Figures, parts related to cylinder 18A are given the suffix "A" and corresponding parts relating to cylinder 18B are similarly numbered and given the suffix "B". Ram extensions 50A and 50B are axially aligned, extend toward each other, and designed to hold an axle between them. As best seen in FIG. 6A, each of these rams and ram extensions includes a spring loaded centering probe member 54A and 54B which may be used to index with lathe centers in the axles to enable accurate axial alignment. As seen in FIG. 6A, probe member 54A is backed by plate 55A which, in turn, is guided in a recess in the ram 34A which contain a helical spring 57A. Spring 57A tends to drive the probe 54A toward the other ram but allows retraction of the probe as needed to permit an axial movement, allowing the probe 54A to bear against the lathe center on the axle, thereby assuring concentricity between ram 34A and axle.

In use the stationary yoke members 52A or 52B provide a stationary shoulder stop against which a pivoting yoke 66A or 66B is held while the wheel bears against the pivoting yoke as the axle is moved in order to mount the wheel on its seat on the axle. Other members may be pressed onto an axle using various extensions to the yoke, typical examples of which will be discussed hereafter.

Figure 5:
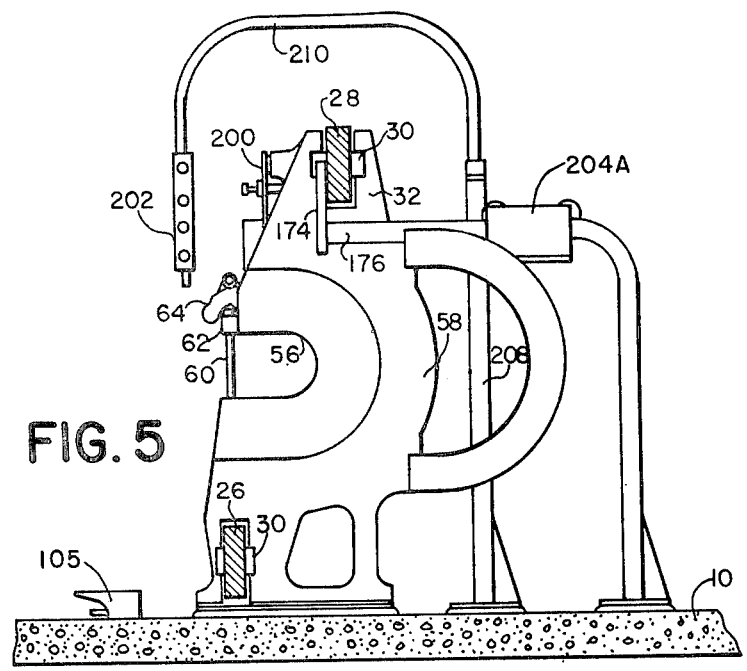
FIG. 5 is a similar scale sectional view taken along lines 5—5 of FIG. 1.

The cast iron resistance beam 16 which stands intermediate the cylinder beams 12 and 14 may best be observed from FIGS. 1, 3 and 5. This structure contains no movable hydraulic ram or other drive structure. It is shaped to permit passage of an axle but provides an immovable object between the rams opposing movement of larger diameter members when an axle held between the ram is moved laterally. Against the resistance beam, or more exactly against extensions of the resistance beam, wheel or other members previously mounted on the axle are moved and held as the axle continues to move to permit demounting of the larger diameter member from the axle. As best seen in FIG. 3 the resistance beam has the mass of its structure out of line with the cylinder beams. The reason for this, however, is seen in FIG. 5 wherein the C-shaped (reversed) opening 56 of the structure faces forward to allow laterial (front to back) passage of the largest axle able to be handled by the equipment into the position in which it is held between the ram extensions 50A and 50B. The resistance beam is enlarged to the rear to provide a heavy reinforced intermediate structure 58 backing up the C-shaped portions. The superstructure 32 is mechanically supported on the intermediate structure 58 and the base from the foundation 10. The base of resistance beams is connected to tension bar 26 and superstructure 32 is connected to tension bar 28 in each case with forged steel keys 30.

The purpose of the removable safety pins 60 is to prevent inadvertent roll out or escape of the axle and yet permit easy removal and replacement of an axle. It is important to permit easy removal and replacement of the safety pin 60 when putting an axle in place or when removing it. Removable safety pins 60 may be held in openings through flanges 62 and received in recesses in the resistance beam structure 58. The pins are preferably connected to the frame of the resistance beam by flexible connection means 64 to discourage detachment from the machine and encourage their use.

Figure 7A:
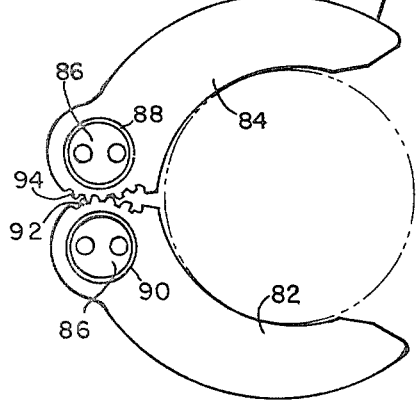
FIGS. 7A and 7B are enlarged detail views of demounting caps in two different positions as viewed along line 7—7 of FIG. 1.
Figure 7B:
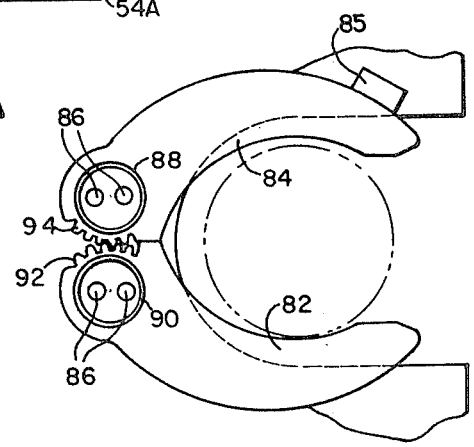

Also supported on the resistance beam structure 16 are a pair of alloyed, heat treated steel caps, or jaw members, 82 and 84, best seen in FIGS. 7A and 7B. Together defining a general C-shape, these jaws are rotatably supported relative to the resistance beam 16 at the opening 56 on the left side of the structure as viewed in FIG. 1. The caps 82 and 84 are each mounted by a connection pins 86 and needle bearings 88 and 90, respectively, which are journaled in the resistance beam 16. Cap 84 is provided with a weight 85 which tends to close the caps to their position of FIG. 7B which defines minimum axle size to be accommodated. The caps move together because cap 84 is geared to cap 82 through the intermeshing teeth 92 and 94. The gearing is such that the caps open and close symmetrically about the axles. The caps may be manually opened by lifting cap 84 to permit introduction of an axle up to the maximum size accommodated in the position of FIG. 7A. The caps bear against and receive lateral support from the resistance beam 16 so that lateral forces encountered, for example, in demounting a wheel or gear are directly transferred through the caps 84 and 86 to the resistance beam 16 which backs them up as seen in FIG. 7B. The alloyed heat treated steel of which the caps are made resists deformation.

Figure 4:
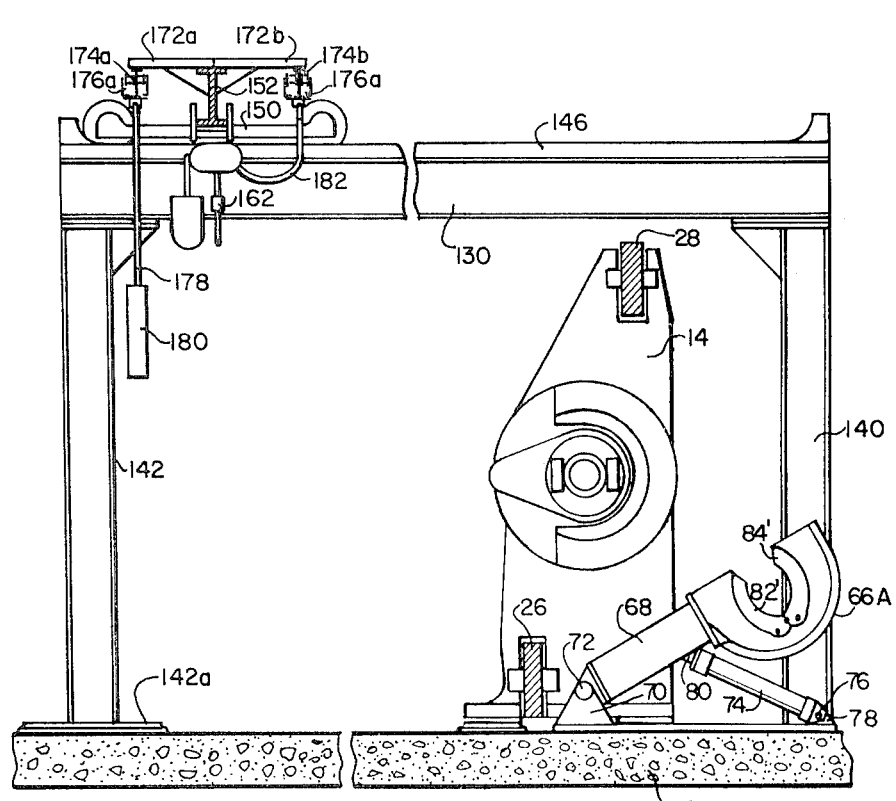
FIG. 4 is a slightly enlarged sectional view taken along lines 4—4 of FIG. 1.

Referring now to FIGS. 1, 3 and 4, attention is drawn to the pivoting yokes 66A and 66B. As best seen in FIG. 4, these yokes are made of cast iron and provide heavy duty C-shaped structures which are supported on pivoted arms 68 to move into positions to enclose an axle engaged at its ends by ram extensions 50A and 50B. Each arm 68 is pivotally connected by pin 72 to a support bracket 70 on foundation 10. Normally the yokes 66A and 66B are in the retracted position shown in FIG. 4, tilted back out of the way of the press operation. Each yoke is provided with a hydraulic extension actuator 74 which is pivotally attached at both ends, to a bracket 78 on the foundation 10 by the pivot pin 76 and to arm 68 by pin 80. All three pins are parallel to the extension of the rams and to the ground, allowing necessary adjustment of interconnected parts as the yokes 66A and 66B move under the urging of actuator 74 up and into alignment with the press. Hydraulic connections for actuator 74 are not shown, but it will be understood that there are such connections enabling axial positioning or withdrawal of the yokes upon command. The support 68 moves to a vertically upright position in moving yoke 66 into a functioning position along the axial path. It will be observed that each of the yokes 66A and 66B has a pair of caps 84' and 82' structurally similar to and functionally like those seen in FIGS. 7A and 7B on the resistance beam. It will also be observed in FIG. 3, for example, that yokes 66A and 66B are positioned immediately adjacent to and move into abutting positions with stationary yokes 52A and 52B, respectively. In use yokes 66A and 66B derive lateral back up support from the stationary yokes 52A and 52B, respectively, where bearing against the hub of wheels during mounting operations.

As best seen in FIG. 3 still another yoke 66D is provided from a bracket 204A (FIG. 5) which rolls on anti-friction bearings on support 176. Yoke 66D is seen in retracted position in FIG. 3 and in operating position in FIG. 1. Yoke 66D is also generally C-shaped composed of high strength ductile iron. Normally the demounting yoke 66D assumes the retracted position shown in FIG. 3, back out of the way of the press operation. However, it is manually movable into effective position as needed. Yoke 66D in a functioning position lies along the axial path between the rams, which passes through the opening of the yoke. As best seen in FIG. 1, in operating position demounting yoke 66D abuts the resistance beam which provides backup support enabling the yoke 66D, in turn, to provide resistance to axial movement of a wheel on an axle to hold the wheel at the rim for demounting as the axle is moved through. The diameter of the yoke 66 is larger than that of other yokes and it is limited to use in demounting wheels, being large enough in diameter to permit uninterrupted passage within the yoke of gears or other structure, as will appear hereafter.

Figure 8:
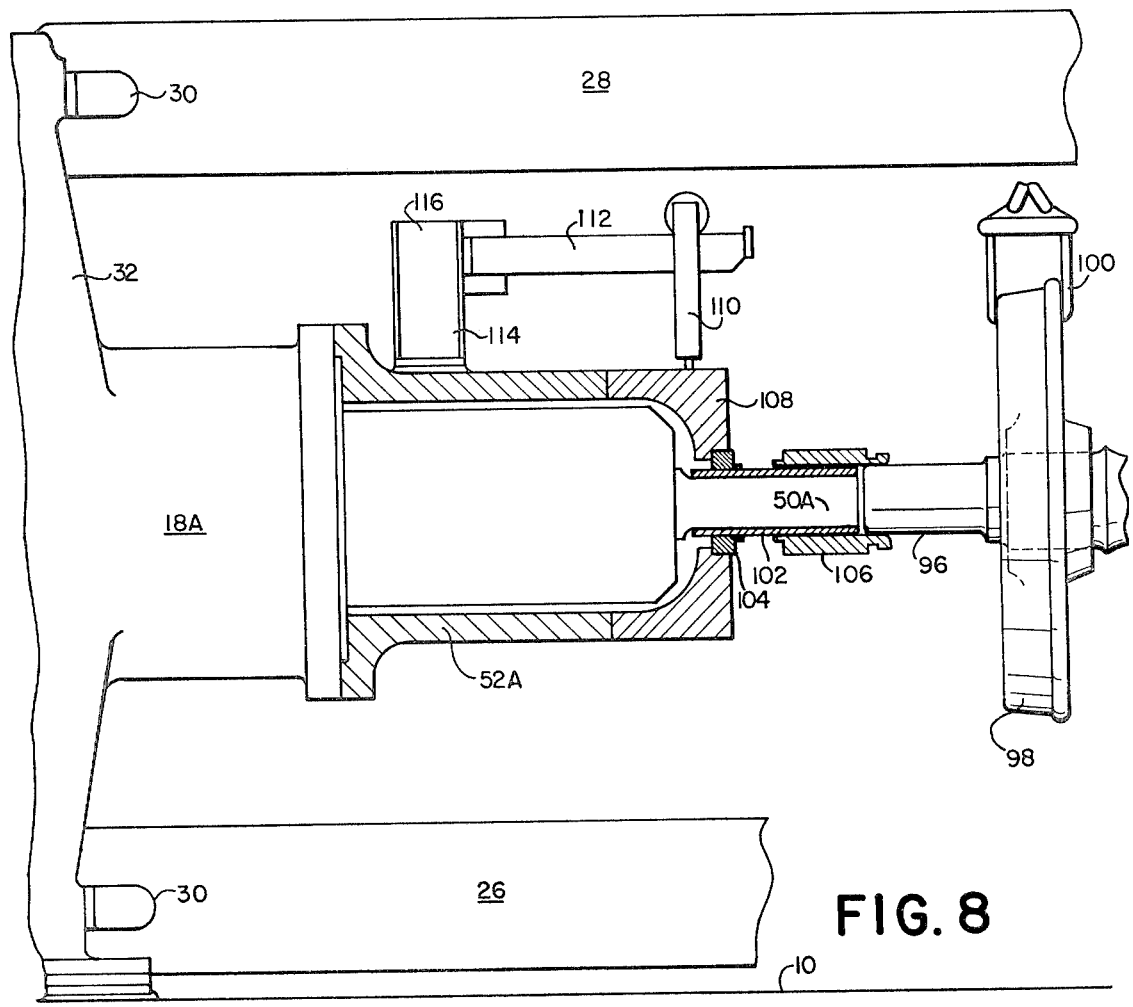
FIG. 8 is an enlarged view partially in section showing an optional jib crane for a bearing mounting assembly supported on the stantionary yoke surrounding one ram.

Referring now to FIG. 8, equipment for mounting bearings is illustrated in association with the ram extension 50A extending from the ram within cylinder 18A. The structure is used in the situation as illustrated where an axle 96 is held between ram extensions 50A and 50B with wheels 98 in place supported by hoist wheel clamp 100. In this situation, a sleeve 102 snugly fitting ram extension 50A is provided as a shim and slide element to enlarge the diameter of the extension 50A to essentially that of the axle 96 at the bearing seat. Collar 104 provides a stop abutment against which a bearing 106 to be pressed onto the axle 96 is held as the ram extension 50 is retracted allowing the bearing 106 to be driven onto the axle 96. The collar 104 is supported by bearing mounting yoke 108 which is a C-shaped structure having an opened side which can pass over the axle when it is moved into operating position. In operating position, it abuts the stationary yoke 52A to provide firm backup to the bearing through cylinder beam 12. Bearing mounting yoke 108 serves the function of reducing the effective diameter of stationary yoke 52A to permit its effective use in mounting a bearing.

The bearing mounting yoke 108 is moved into place by a jib boom which includes a vertical support and roller member 110 which allows the movement of the yoke 108 out along the length of the jib boom 112 and back as required. The jib boom 112, in turn, is supported on a rotating bearing sleeve 114 which surrounds support pivot post 116 on the stationary yoke 52A. Thus, boom 112 is pivoted around post 116 to remove yoke 108 from the active use position shown and out of the way of pivoting yoke 66A whenever it needs to be moved into place. The roller and jib boom allow adjustment of yoke 108 into the stationary yoke 52A to provide backup through its supporting cylinder beam 12.

Because of the auxiliary equipment behind the press and particularly the pivoting yoke 66A, 66B and 66D, it is desirable to have a safety rail or fence 114 supported by suitable posts 116 which extends from behind cylinder beam 12 around to the hydraulic reservoir 118, as generally shown in FIG. 3.

In order to give some idea of the dimensions of wheel sets handled by the preferred embodiment illustrated, therefore, of the press itself, it will be understood that the press is capable of handling a wheel set of the following dimensions: axle length 83 inch minimum through 92¾ inch maximum; gear diameter 31 inch maximum; wheel diameter 34 inch minimum through 44 inch maximum; gauge standard AAR gauge 56½ inches. Of course, other gauges could be used as desired and the axle dimensions specified could vary considerably. Some of the modifying equipment provided allows a minimum wheel diameter of 28 inches through a maximum of 44 inches for standard wheel sets. Bearings of various sizes can be conventionally handled with the minimum bearing size for the ordinary size ram extension being 5½ inches by 10 inches and the maximum bearing size being 7 inches by 12 inches. Smaller bearings than 5½ inches by 10 inches can be accommodated using a pair of smaller diameter ram extensions, and ram extensions as described herein are preferably, therefore, made removable.

Figure 2:
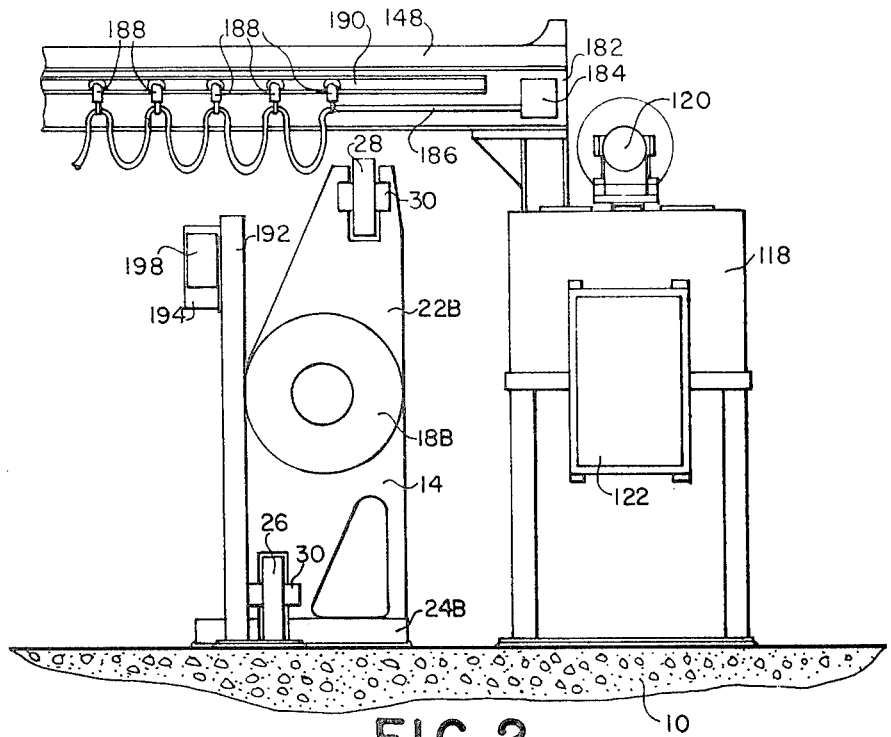
FIG. 2 is a slightly enlarged view from one end of the apparatus shown in FIG. 1 with part of the crane broken away.

Referring to FIGS. 2 and 3, a reservoir tank 118 for the hydraulic fluid includes a conventional pump (not shown) as well as the incompressible fluid, and is elevated on legs. The reservoir typically might contain 250 gallons of incompressible fluid for driving the rams of the hydraulic cylinders. The reservoir is positioned to afford easy access to the cylinders 18A and 18B through conventional plumbing which, of course, is designed to take the high pressure involved. Power for the system, including the hydraulic motor is provided by a 50 horsepower motor 120. The operation of the system is controlled by various electrical and hydraulic controls contained in control boxes to be described hereafter.

Also associated with the wheel press as an optional but highly desirable feature is a crane which enables the support and transport of the various parts loosely assembled or assembled parts for disassembly. The crane may also carry various yokes and fixtures to be used in connection with an assembly or disassembly process.

The crane is supported on two elevated I-beams 130 and 132 arranged parallel to each other and to the ground and, as seen in FIG. 3, extending transverse to and over the press just inside the end of the respective cylinders 18A and 18B. Beam 132 is supported on upright posts 136 and 138 which may be provided with enlarged footplates 136a and 138a and suitable bracing. Beam 130 is supported on post 140 and 142 with similar footings 140a and 142a. Additionally, in practice, although it is omitted here for clarity, cross-bracing between the beams 132 and 130 at one or both ends is a possibility.

Affixed to the top of the beams 132 and 130 are rails 144 and 146 to carry the alligned wheels trolleys 148 and 150. At least one of the trolleys carries a drive motor (not shown) which is on the order of ½ horsepower and drives one of the wheel sets on its trolley. Trolleys 148 and 150, in turn, support a bridge 152. The bridge 152 is an I-beam the lower flange 152a of which, in turn, supports hoist carriages 154 and 156. These carriages roll along and are positionable along the lower flange 152a. Each hoist has its separate but independent hoist motor 158 and 160 (on the order of ½ horsepower) which includes direction changing capability and drive means for the hoist chain or cable and connection 162, 164. The hoist carriages may be positioned by hand along the flange 152a of bridge 152. Various types of lifting attachments may be provided, of which the wheel lifting clamps or tongs 166 and 168 are an example.

Power is provided to units 160 and 158 from a power line from junction box 170 mounted atop bridge 152. Conductor lines from the junction box are fed out along opposite sides of the beam 152. In practice, as seen in FIG. 4, a superstructure is provided above beam 152 in the form of a cross plates 172a and 172b which, convert the beam structure to a T-shaped cross-section. Cross plates 172a and 172b, in turn, support beneath their outer edges small rails in the form of I-beams 174a, 174b, which, in turn, support a series of cable supports 176a, 176b. The cable supports have wheels on flanges resting on the lower flange of rails 174a and 174b, respectively. As seen in FIG. 1, there are a plurality of similar supports 176a supporting cable 178 which terminates in a pendant control 180 for the hoist elements. On the reverse side of the structure from that viewed in FIG.1, there are likewise a plurality of cable carriers 176d (seen in FIG. 4) which carry cables 182 to hoist drive motors 158 and 160. These cables, such as 182 which leads to hoist control 158, may carry as many conductors as necessary to permit the pendant control 180 to do the necessary switching and cause each of the hoist motors to move its cable or chain up or down. Hoist position along the bridge is manually adjusted and is self adjusting in response to forces generated through loads carried.

As seen in FIG. 2, beam 182 carries a junction box 184 which is fixed relative to ground and into which a power cable (not shown) is fed from control box 122. Out of junction box 184 extends a cable 186 which is carried in cable loop supports 188, similar to supports 176a and 176b. Loop supports 188 run on a small I-beam rail 190 supported from the upper flange of I-beam 132 by a support plate (see FIG. 1) similar to rails 174a and 174b. These cable loop supports move to permit the cable 186 to be gathered and extended as needed as the bridge trolleys 148 and 150 move along rails 144 and 146. The cable 186 feeds power to the bridge motor drive (not shown) driving wheels of the trolley 148 permitting the bridge 152 to be positioned forward toward the press or back away from the press in accordance with commands to the bridge motor. Cable 186 is also connected to the junction box 170 atop bridge beam 152 and provides the power input to the bridge and control back from pendant control 180. It will be observed from FIG. 3 that the crane is able, for example, to pick up a wheel set from the tracks 192A, 192B and carry it to the press, or to pick up a wheel set from the press and carry it back to the tracks.

Figure 9A:
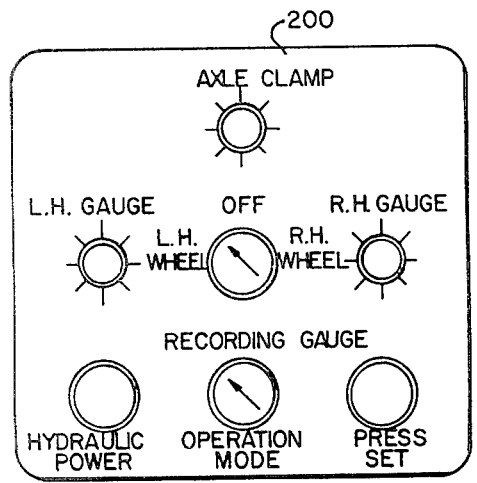
FIG. 9A is an enlarged front view of the process control panel visable in FIG. 1.

The controls for the system are distributed as is best seen in FIG. 1. The pendant control 180 for the bridge and hoist motors, which hangs from the bridge beam 152, is illustrated in FIG. 9C. As seen in FIG. 9C, pendant control 180 provides controls for moving the bridge "in" to the press and "out" from the press, for separately moving the lefthand and righthand hoists up and down. To use this control, one walks along with the bridge 152 under which the control 180 is always located.

Again, as best seen in FIG. 1, the panel support 102 adjacent cylinder 18B carries the control panel 196 and a pressure vs. ram position recording meter 194, and may contain other electrical controls and meters as well.

At the center of the apparatus is a process control station 200. Panel 200 is supported on the resistance beam 16. The upper portion contains the visually read hydraulic pressure gauge and a system pressure control that sets the pressure in the "bearing mount" mode. The lower portion 200a is the process control station shown in FIG. 9A. This panel has indicator lights showing when the axle is clamped, when the recording gauge is set for lefthand wheel mounting and when the recording gauge is set for righthand wheel mounting. There are two selection switches in the center of the panel. The upper switch may be turned to select the operation of the recording gauge appropriate to the lefthand wheel, or the righthand wheel, or to "off". The position switch for operating mode may be set to "bearing mount", "mount" or "demount" positions, the significance of which operation modes will appear hereafter. Hydraulic power light indicates whether hydraulic power is "on" or "off". The "press set" pushbutton enables operation of valving to permit adjusting maximum system pressure in bearing mounting mode.

Figure 9B:
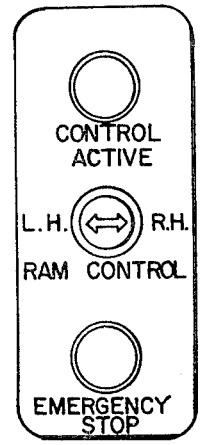
FIG. 9B is a similar view of the mounting control panel.
Figure 9C:
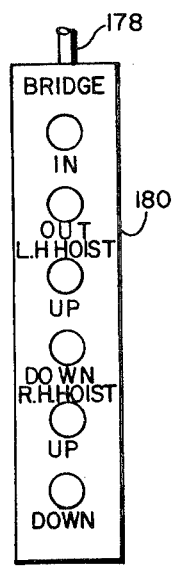
FIG. 9C is a similar view of the crane control station.

A demount control station 196 is shown at FIG. 9B. This panel contains a light at the top which is illuminated when in "demounting mode" and the axle clamp is on. There is a joy stick control switch for ram control in the center of the panel to extend the righthand or lefthand ram. There is an emergency stop pushbutton which deenergizes control circuits and hydraulic power, if necessary.

Press pendant station 202, a three dimensional panel is supported on a swiveling arbor 210 best seen in FIG. 5. Conduit arm 210 makes its swiveling joint with a large conduit post 208, thereby providing an arbor which enables supported control 202 to be repositioned to enable a better view of whichever side of the press work is proceeding on. Control 202 is illustrated enlarged in FIG. 9D. The front of the three sides panel provides a light showing when the axle clamp is on. An axle clamp select switch initiates movement of the rams together and supplies the axle clamp as will be explained later. On the rightside of the structure, panel 202 has righthand ram control including separate pushbuttons for extending and retracting the righthand ram. It also provides the joystick control for raising and lowering the righthand mounting yoke. The corresponding elements for the lefthand side are on the lefthand side of the device. Finally, an emergency stop toggle switch is provided at the bottom to disable the whole control and stop whatever action has been ordered at the pendant station.

FIGS. 10 through 13 show various manually or crane positioned types of yoke, or special adapters, for processing "highliner" wheel sets. FIGS. 10A and 10B show a yoke 95 for extending the rolling yoke 66D. FIGS. 11A and 11B show a fixed cap 97 for the resistance beam 16. FIGS. 12A and 12B show a "C" yoke 99. FIGS. 13A and 13B show a mounting yoke 101. FIG. 14 illustrates a bearing demount cap 103 used when demounting anti-friction bearings as illustrated in FIG. 27C. Each of these yokes or caps is used in connection with some process which will be described hereafter.

Figure 16:
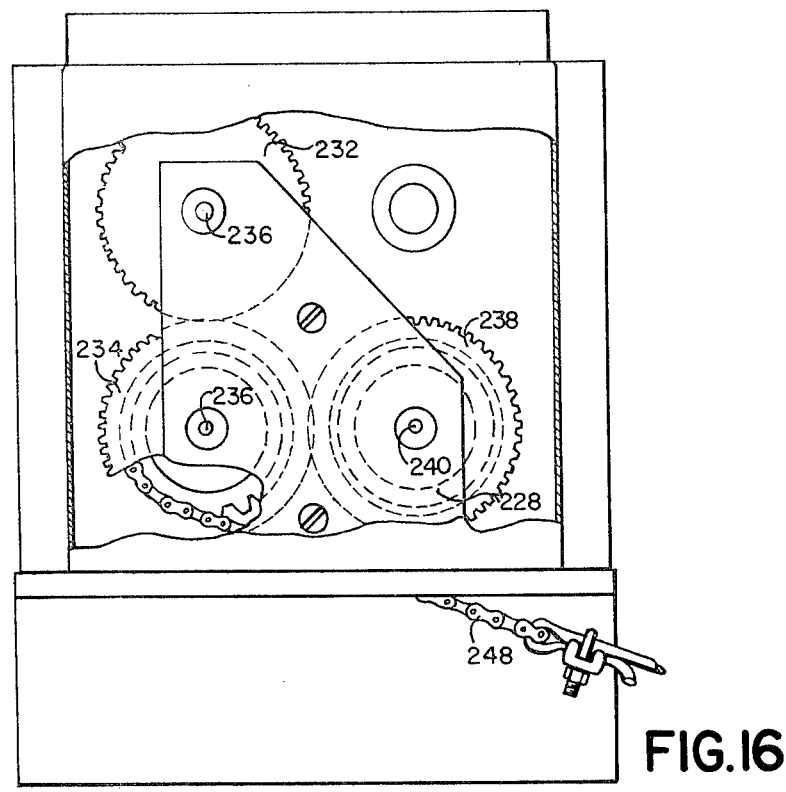
FIG. 16 is an enlarged view of the clutch controlled portion of the structure of FIG. 15.
Figure 17:
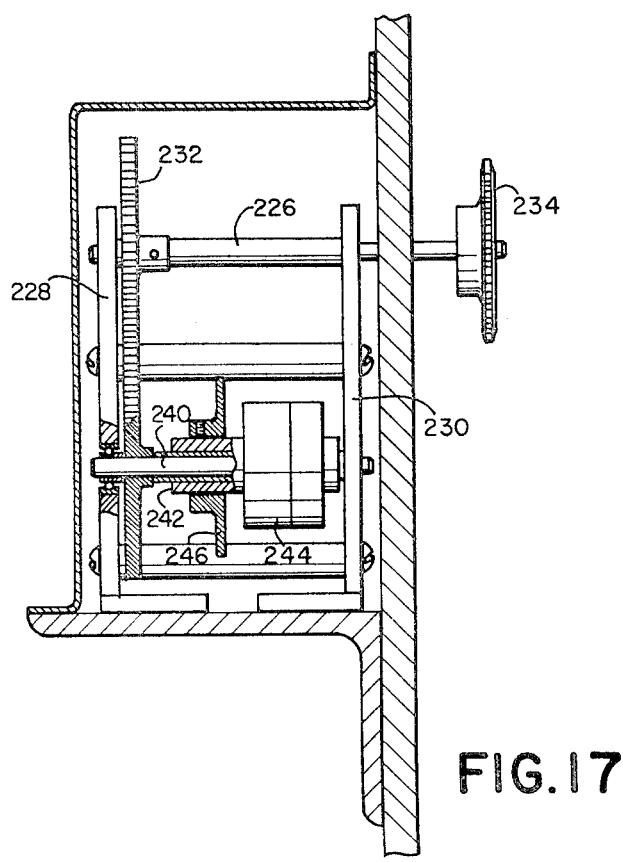
FIG. 17 is an end view of the structure of FIG. 16 on the same enlarged scale.

Considering now the structure of FIGS. 15, 16 and 17, there is illustrated the essential parts of the clutch control for the recording gauge. Because of the nature of the system, movement of the rams toward one another to clamp the axle between them accounts for the only situation in which both rams cannot move together. Since both rams move together in all work processes, the total effective movement can be recorded in reference to the movement of one ram, if both forward and backward movements of the ram are recordable in the same manner.

In this system, the recording gauge may include an Ashton Recording Gauge calibrated to 200 tons or another conventional recording gauge which is driven by a sprocket wheel 220 on a shaft which is connected by drive chain 222 to another sprocket wheel 224. Sprocket wheel 224 is mounted on a shaft 226 rotatably supported on frame plates 228 and 230. Shaft 226 carries a gear 232 which meshes with another gear 234 of similar diameter and number of teeth on shaft 236. Gear 234, in turn, meshes with gear 238 on shaft 240. Shafts 236 and 240 have identical structure on them, in that they both carry a journaled hollow shaft similar to 242 which may be clutch connected to shaft 240 when driven in one direction through clutch 244 and disconnected when driven in the other direction, such clutch control devices being well-known in the art. Each of the hollow shafts, in turn, carries a sprocket wheel corresponding to wheel 246, and both of those sprocket wheels engage chain 248. The clutches are preferably electrically actuated clutches such that a switch energizing one of the clutches is closed whenever ram 34A moves forward and the other clutch is energized whenever ram 34B moves forward with both being disabled by a control interlock switch (not shown). The result is that, except when the clutch is engaged, the sprocket wheel does not drive its gear, but the gear runs free. Thus, gear 234 may drive gear 232 directly or, when its clutch is deenergized, gear 238 may drive gear 232 through the intermediary of gear 234 which is freewheeling at the time.

Drive is accomplished through guide rod 250 to which the chain 248 is attached. Guide rod 250, in turn, is attached to the ram 34B and may move from the position shown in phantom to the position shown in full lines, and back and forth between these positions, each such movement being representative of linear ram movement. Linear movement is not recorded until both rams engage the axle in axle clamp and are in a mode in which they move in synchronism. An electrical interlock is used to prevent energizing the clutches at any other time, for example, and disables the recording gauge until the rams move together so that movement of ram 34B is representative of movement of ram 34A as well. The chain 248 may be attached to a cable 252 which, in turn, is attached to a fixed point on the frame 254 after passing over an idler pulley 256 and under a free pulley 258 supporting a weight 260. Thus, it will be seen that the apparatus records all linear movement of the ram when it is doing effective work.

Both the hydraulic and electrical systems of the present invention provide new features and new functions but the actual equipment and components used are standard equipment readily available on the market. It is, therefore, unnecessary to illustrate or describe the specific pieces or the combination of structure. Both wiring and hydraulic plumbing have been omitted from the drawings of mechanical structure for the sake of clarity. However, it will be understood that such wiring and plumbing are necessary and that in addition to circuits and systems and specific components and equipment actually used in constructing a prototype, many variations of that such systems are possible, including variations in the panels and other types of equipment shown in the drawings and hydraulic diagrams herein.

Figure 18:
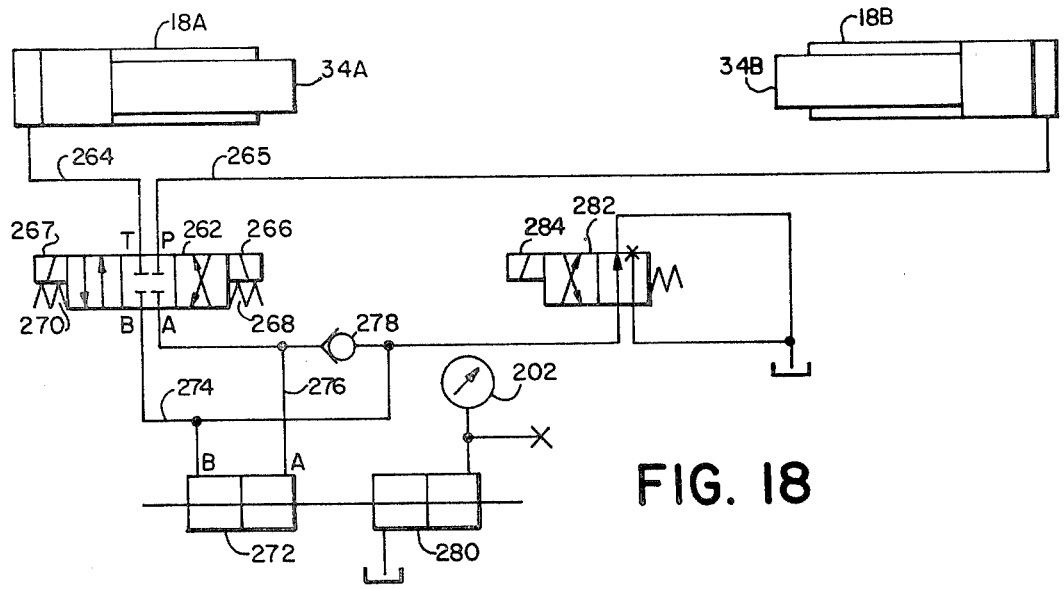
FIG. 18 is a schematic diagram of the hydraulic system providing a differential pressure sensor.

Referring first to FIG. 18, there is illustrated the differential pressure sensor which senses the pressure in each of the cylinders, compares the two pressures and then provides the recording guage with a pressure equal to their difference. A double solenoid valve 262 has its port T connected to the ram drive pressure side of cylinder 18A by line 264. Port P of valve 262 is similarly connected to the corresponding side of cylinder 18B by line 266. In the neutral position, in which the valve 262 is shown, the outlet ports B and A are blocked from the inlet ports T and P. The valve is shifted to positions which connect the inlet and outlet ports in alternate ways by solenoids 267 and 266, which act, respectively, against springs 268 and 270 to restore the valve spool to neutral position. The solenoids are provided with circuit means which position the valve, such that the higher pressure will always be connected to port B. The double rod end differential cylinder 272 has the higher pressure output from port B of valve 262 transmitted to its port B in all cases through line 274. Port A of differential cylinder 272 is connected to the lower pressure output port A of valve 262 through line 276. An interconnecting loop, including check valve 278, has the check valve oriented so that as long as the pressure appearing at port B is higher than the pressure appearing at port A of valve 272, as designed, the check will remain closed. The double rod of differential cylinder 272 is connected to and moves with the rod of pressure responsive pump 280. Pressure gauge 202 is connected to the high pressure side of pressure responsive pump 280. The same line provides a fill port, which is normally closed to preserve the pressure. The opposite side of pressure responsive pump 280 is vented to tank.

The single solenoid 284 of valve 282 when deenergized, vents ports B in the position shown. Otherwise, if solenoid 284 is energized the pressure at the gauge port of pressure responsive pump 280 is proportional to the difference of the pressure at ports B and A of cylinder 272.

Figure 19:
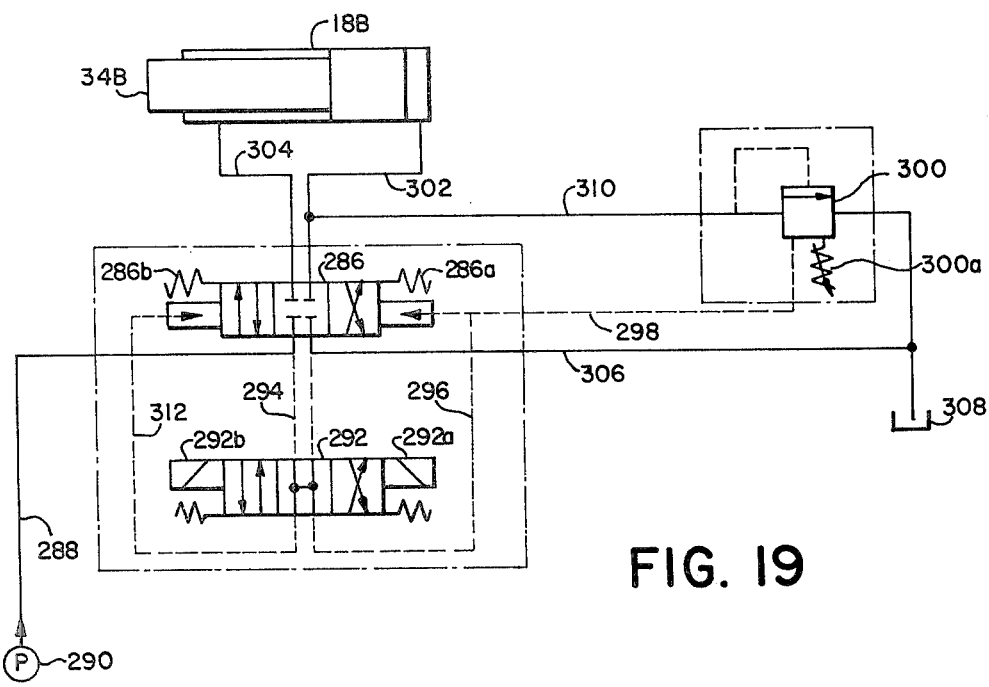
FIG. 19 is a schematic hydraulic diagram of the decompression system of a main hydraulic press cylinder.

FIG. 19 shows a schematic view of a hydraulic decompression circuit, which is needed because the wheel press operates at several thousand pounds per square inch of fluid pressure and large flows. The direction control valves for the rams are large and large directional control valves must still shift quickly and under high pressure. Under these circumstances a hydraulic shock (commonly referred to as "waterhammer") is usually experienced. However, the present simple decompression circuit functions automatically to eliminate this undesirable and destructive shock.

FIG. 19 shows the decompression circuit applied to one cylinder 18B, for example, in connection with the hydraulic decompression circuit of the present invention. In this case, the main valve 286 for moving the ram 34B in the cylinder 18B is represented schematically. Main valve 286 is a double-acting pressure responsive valve whose spool is normally held in neutral position by spring 286a and 286b. The hydraulic pressure is supplied through line 288 from pump 290. When the main ram is to be extended, solenoid 292a of directional control valve 292 is energized. The shift of the spool of valve 292 allows the pump 290, which is connected to pilot line 294, to be cross-connected to pilot line 296 which supplies pilot pressure to the right end of the spool of valve 286 to urge it leftward. It also provides pilot pressure through line 298 to decompression valve 300. The shift in the spool of main valve 286 connects the pump 290 through line 302 to the head of the cylinder 18B to drive the ram in an extending direction. Line 304 from the forward end of the cylinder is cross-connected by valve 286 to the line 306 to the tank. The main ram 34B extends at a rate proportional to fluid pump volume under these circumstances.

When the ram meets a resistance, as occurs when a car wheel is pressed onto an axle, the pressure in the head end of the cylinder rises in direct proportion to the resistance experienced by the ram. This pressure will be recorded by the pressure guage 202 of FIG. 18 and is also applied to the Ashton recording guage to give a continuing chart record of pressures.

When the wheel is properly positioned, solenoid 292a is deenergized cutting off pressure to the spool of valve 286 which allows the spool of valve 286 to return to the neutral position shown in FIG. 19 under the urging of spring 286b. Since all ports are blocked in neutral position, the pressure in the head end of the cylinder 18B is maintained.

At this point the decompression valve 300 acts as a relief valve. Valve 300 normally remains closed under the urging of spring 300a. The valve will remain closed as long as the pressure at the vent port connected to pilot line 298 equals or exceeds the pressure in line 310. This is the condition while the ram is extending and experiencing resistance since the lines 298 and 310 are always simultaneously connected to the pump, respectively, through the pilot valve 292 and the main valve 286. The solenoid 292a is deenergized upon the decision to terminate advancement of the ram or pressure exerted by it. However, the pressure in line 310 is maintained while the pressure in line 298 is vented to the tank 308 and quickly drops. This differential pressure across the decompression valve 300 overcomes the spring setting of the valve to vent the line 310 to tank 308, thus, relieving the pressure in line 302 and in the cylinder. The decompression valve 300 need only be a small size since the hydraulic fluid is only slightly compressible. That is, the cylinder is decompressed in a very short period of time even though the small decompression valve releases only a small amount of fluid. Since the cylinder pressure has been decompressed, the main spool of valve 286 will shift without the undesirable shock referred to as "waterhammer".

Thereafter, solenoid 292b may be energized to position the spool of pilot valve 292 so that pressure is fed through line 312 to the end of main valve 286. Such pressure shifts the spool to the position in which pressure feed through is direct to line 304 so that pressure is fed into the front of cylinder 18B to retract the ram 34B. When the spool of valve 286 shifts, the line 302 is also connected to the tank 308 through line 306. As the ram 34B moves back into the cylinder 18B, the fluid is drained at tank pressure and presents no resistance to fluid pressure retracting the ram.

Figure 20A:
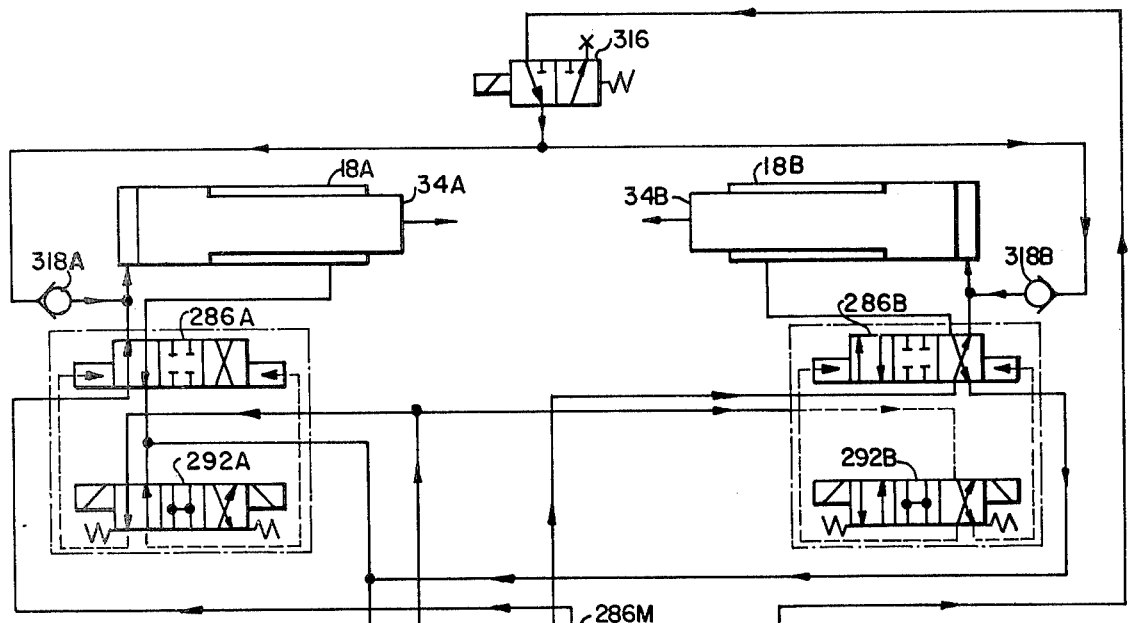
FIGS. 20A, 20B and 20C are similar schematic hydraulic systems diagrams representing different combinations of valve positions for producing axial clamping, extending the right-hand ram, and extending the left-hand ram, respectively.
Figure 20B:
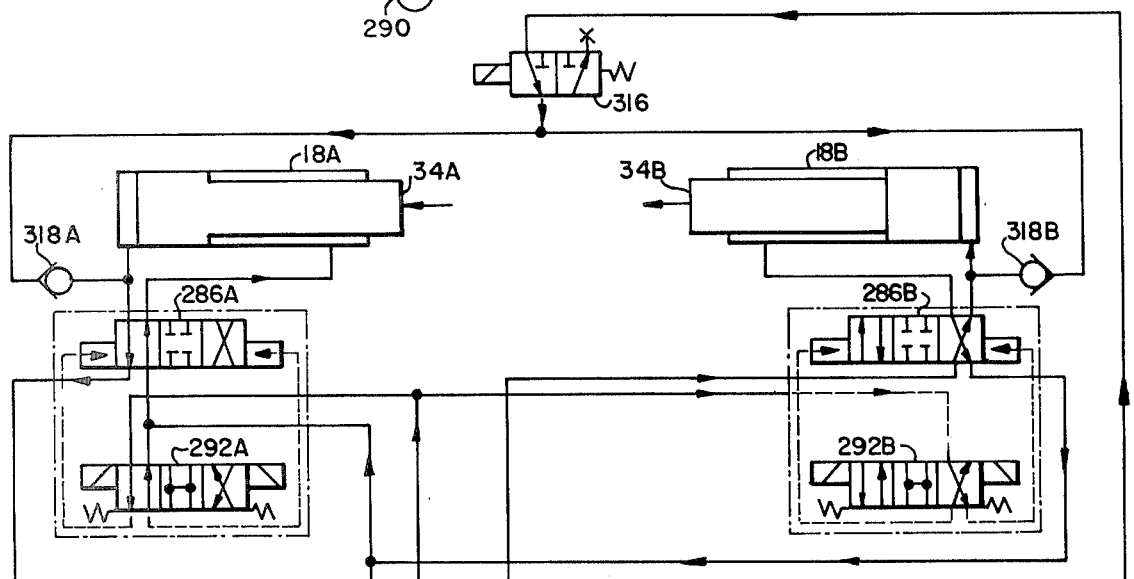
Figure 20C:
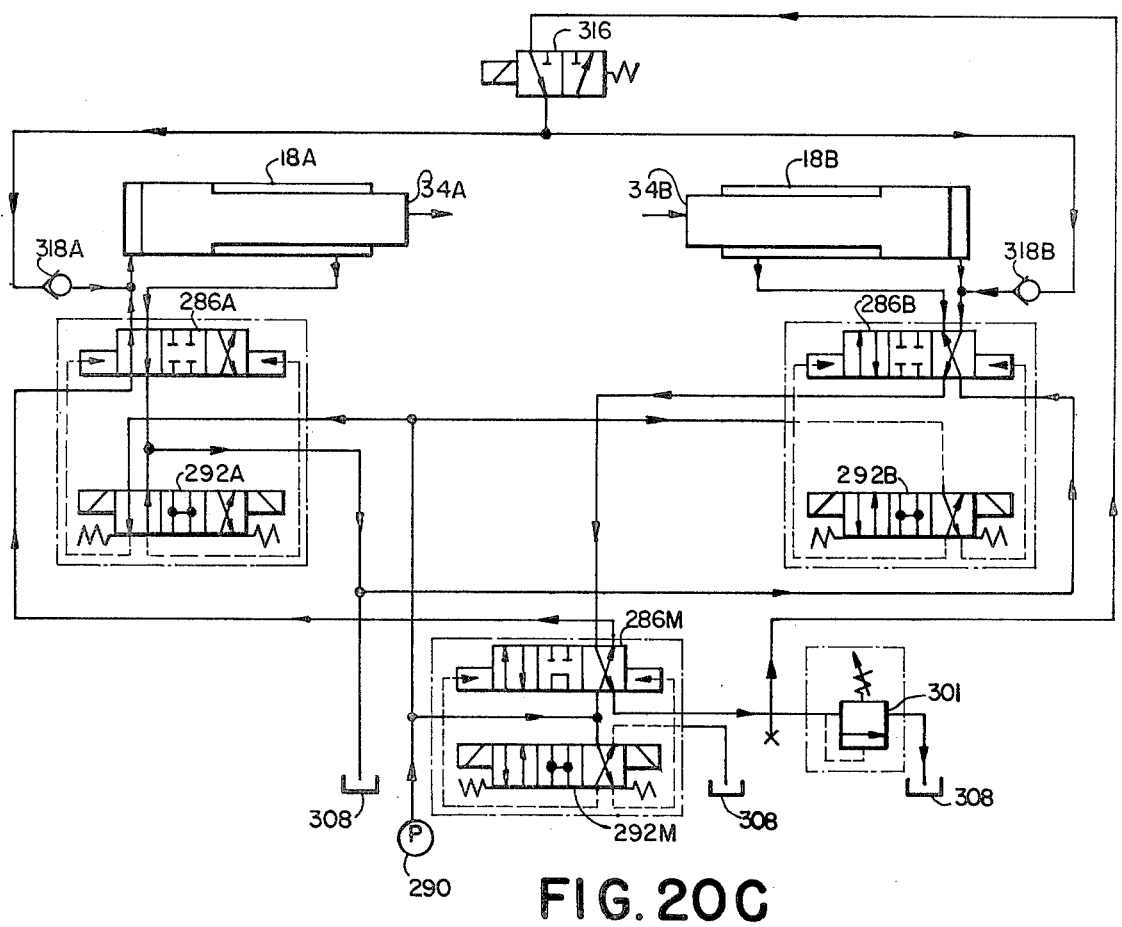

Referring now to FIGS. 20A, 20B and 20C, these three diagrams repeat the diagram of FIG. 19 and add a similar hydraulic control circuit to cylinder 18A to control the rams 34A and a further mode selection circuit to determine how fluid pressure is to be distributed to cylinders 18A and 18B. FIG. 20A shows the axle clamping mode. FIG. 20B shows the mode in which the righthand ram is extended. FIG. 20C shows the mode in which the lefthand ram is extended. In each case, each hydraulic control circuit functions essentially like the circuit for cylinder 34B shown in FIG. 19 and corresponding circuit components for each of the subcircuits are provided with differing suffixes, those for the righthand ram being designated B, those for the lefthand ram designated A, and those for mode selecting circuit designated M. Thus, the lefthand ram 18A has pilot valve 292A and main valve 286A. The righthand cylinder 18B has pilot valve 292B and main valve 286B. Each of these cylinder control systems, in turn, is controlled by the mode selection hydraulic circuit which has a pilot valve 292M and a main valve 286M. In each of these cases, the pump 290 feeds an inlet line into the pilot valve 292. Similarly, each of the sub-systems has an output to tank 308. Not shown, each cylinder is equiped with a decompression valve 300. An additional solenoid valve 316 in energized position provides access to the drive end of each of the rams through check valves 318A and 318B from a fluid fill port.

In the axle clamping mode shown in FIG. 20A, the main mode-selecting valve 286M and pilot valve 292M are both left in neutral position and the mode-selecting control is not active. Instead, the pump supplies pressure to the pilot valves 292A and 292B which are energized so that their respective spools are positioned as shown so that pilot pressure drives main valves 286A and 286B to the positions shown. In these positions the pump is connected to the cylinder in each case through valves 316, 318A and 318B to drive the rams 34A and 34B forward toward one another to produce clamping action. The forward end of each cylinder is connected to tank. When the axle is engaged with suitable pressure at its ends, it is supported and needs no additional support. The pressure in each cylinder 18A and 18B is determined by the relief valve 301. With axle clamp applied, whenever one ram extends, it pushes the opposite ram, through the axle, to retract. For example, when ram 34B extends, (see FIG. 20B) ram 34A is pushed to retract and the fluid expelled from the rear of cylinder 18A dumps across relief valve 301, thereby maintaining back pressure to hold the axle rigidly between the rams.

Thereafter, when the right ram 34B is to be extended and the left ram 34A withdrawn, as shown by the arrows in FIG. 20B, the valve positions shown in FIG. 20B are assumed. In these positions, the pilot valve 292M of the mode selection control is positioned, as shown, by the appropriate solenoid to cause pilot pressures, in turn, to position the main valve 286M, as shown. In the positions shown, flow through valve 286M applies its output pressure through main valve 286B to the rear of cylinder 18B to extend ram 34B. This, of course, is dependent upon the selection circuit energizing the proper solenoid to position pilot valve 292b as shown, thereby properly positioning main valve 286 to permit the desired result. The backend of ram 34A is vented to tank through relief valve 301 in the position shown. Thus, as indicated by arrows, as ram 34B advances, ram 34A retreats at a pace determined by ram 34B and in such a manner as to maintain the pressure on the ends of the axle.

FIG. 20C produces the opposite result as indicated by the arrows showing ram movement. In this case, pilot valve 292M is energized to the opposite position from that shown in FIG. 20B in order to permit the main valve 286M to assume its opposite position and thereby apply pressure its opposite position and thereby apply pressure to the end of cylinder 18A to drive its ram into extended position in the direction shown. This, of course, requires proper actuation of the solenoid to position pilot valves 292A and 292B and main valves 286A and 286B, essentially as in FIG. 20C to permit this result. Pump flow 290 is connected to back side of cylinder 18A through valve 286m and valve 286A cuasing ram 34A to extend. At the same time back side of cylinder 18B is connected across relief valve 301.

It is now possible to consider the use of the apparatus in performing the various methods of which it is capable. To this end, the apparatus has been represented schematically in partial drawings which effectively show cylinders 18A and 18B, ram extension members 50A and 50B, stationary yokes 52A and 52B and the resistance beam 16 in all cases. In each case where the axle is shown, regardless of its form, it is called "axle 96" for consistency. Whenever wheels are shown they are "wheels 98" and the supports for the wheels are "supports 100" to be consistent with prior description. It will be understood that different forms of these devices may be employed.

Figure 21A:
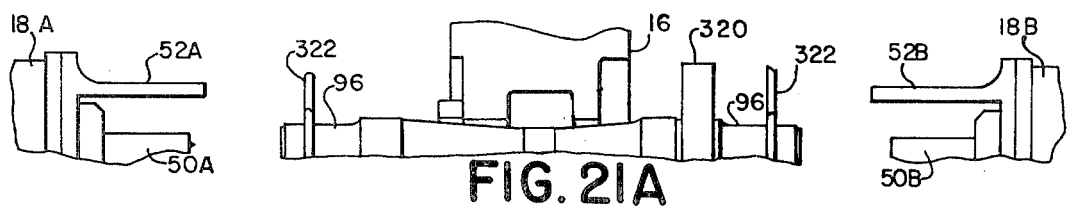
FIGS. 21A and 21B are schematic diagrams representing successive positions of the press in the course of gear mounting procedure.
Figure 21B:
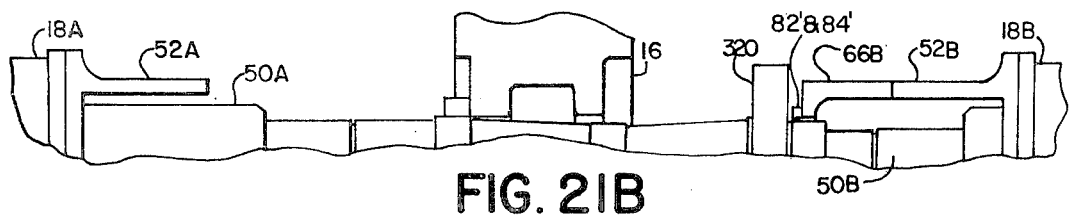

FIGS. 21A and 21B show gear mounting procedure, the gear in these diagrams being gear 320. As shown in FIG. 21A, in order to mount the gear, the axle 96 with the gear loosely assembled onto the axle is conveyed to the press using nylon slings 322 and positioned between ram extension members 50A and 50B, as shown. These slings are supported from the overhead crane which is used to position the axle as shown in FIG. 21A. Each ram is extended to engage the axle end faces from the position shown in FIG. 21B until the axle clamp is applied. At this stage, the slings are removed and the pivoting yoke 66B is moved into position. This is done in the manner described in connection with FIG. 8. Hardened caps 82' and 84' is preferably employed on yoke 66B in position close to the axle to press against the hub of the gear 320. The press is then directed to the mount mode. The lefthand ram is extended driving the axle to the right until caps 82' and 84' bear against gear 320 and thereafter holds the gear in place as the axle continues to move until as seen in FIG. 21B the gear is seated. Thereafter, the wheel set is recentered, and the pivoting yoke 66B is removed and slings 322 replaced. The axle clamp is then removed and the axle is free to be conveyed away from the press using slings 322.

Wheel mounting procedure is shown in FIGS. 22A, 22B and 22C. First, the wheels 98 are loosely assembled on the axle. Then, the assembly is picked up by the hoists using wheel clamps 100 to grasp the wheels and the crane conveys the assembly to the press to the position shown in FIG. 22A. Once in position on the center line of the press, each ram is extended to engage the axle end faces and "axle clamp" is applied. Next, the "mount mode" is selected and the left ram is extended slightly to clear the space to move lefthand pivoting yoke 66A to its active position as described in connection with FIG. 8. The "mount mode" is maintained but set to extend the righthand ram. That is, the righthand ram 50B moves the axle 96 and lefthand ram 50A to a position where the wheel 98 abuts yoke 66A. The recording gauge is then directed to record, and, using the footswitch 105 (seen in FIG. 5), the righthand ram is extended until the lefthand wheel is seated. When the lefthand wheel is seated, the recording gauge is turned to "off". Next, the left ram advance setting is set and drives the axle right to permit removal of yoke 66A. It may be necessary to move the ram back to the left to insert yoke 66B. Following this the left ram advance position is selected. The left ram advance moves the assembly into the position shown in FIG. 22C in which wheel 98 abuts yoke 66B. The recording guage is set to its "r.h. wheel" position and the left hand ram advanced with the footswitch 105. As the lefthand ram is extended the axle 96 moves but the loose wheel is held against yoke 66B. Continuing pressure applied by the footswitch 105 will press the axle into the wheel position. When the wheel is seated the recording guage is turned to an "off" position. The axle is then recentered. The righthand pivoting yoke 66B is moved clear of operating position. The axle clamp is then removed and the ram is retracted so that the assembly is suspended from the hoists. The rigid assembly is then conveyed from the press.

Figure 23C:
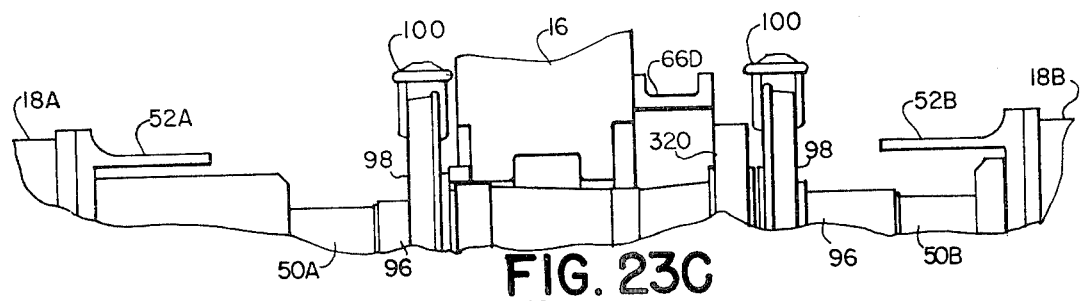
Figure 23D:
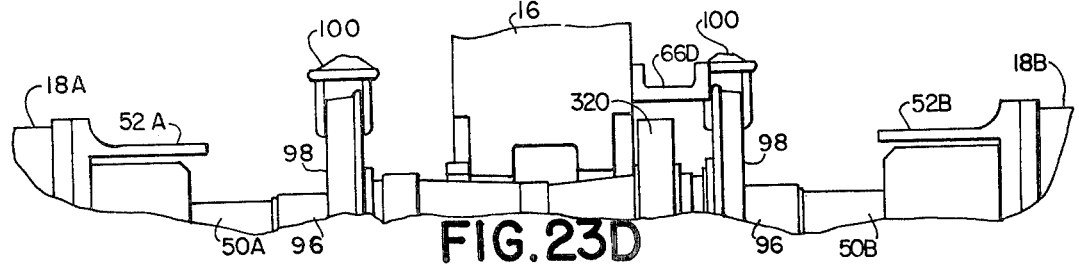

The reverse procedure, or wheel demounting procedure, is shown in FIGS. 23A, 23B, 23C, and 23D. Thus, as seen in FIG. 23A, the rigid wheel assembly is conveyed to the center line of the press. The press is directed to "demount mode". As shown in FIG. 23B, each ram is then extended to the axle faces and the "axle clamp" is applied. Thereafter, the lefthand ram is extended moving the axle 96 to the right until the left wheel 98 is abutted by the demounting caps 82 and 84 of the resistance beam 16. As mentioned above the caps are self-adjusting to closely enclose the axle after opening in response to moving the axle into the position of FIG. 22A. The lefthand ram, and the axle it drives, continue to advance as seen in FIG. 23B until the wheel is pressed off of its seat onto the axle. Next, the demounting yoke 66D is moved into active position. As seen in FIG. 23C, the demounting yoke 66D is of such diameter that it clears the gear 320 which is in place. The righthand ram is then extended moving the axle 96 to the left until the yoke 66D abuts the wheel rim as seen in FIG. 23D. Yoke 66D continues to oppose the leftward movement of the wheel 98 and the axle moves until the wheel is loose. At this point, the lefthand ram is extended until the wheel set is centered. The demounting yoke 66D is removed to clear its position. The axle clamp is removed leaving the axle wheel set suspended from the hoist and the crane conveys it from the press as a loose assembly.

Figure 24:
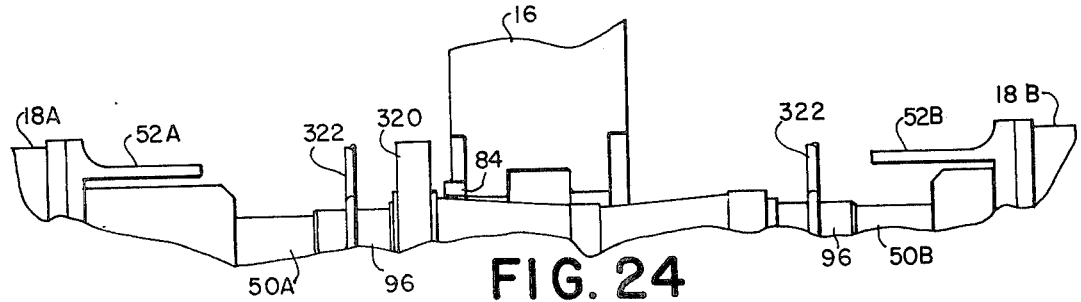
FIG. 24 is a schematic diagram showing of gear demounting procedure.

FIG. 24 in a single figure shows the arrangement for the gear demount. In practice, removal of the gear 320 is done infrequently and requires the axle to be turned around, from its previous position in FIG. 23D in which wheels were demounted. The axle is conveyed to the press using nylon slings 322 in the orientation shown in FIG. 24. The axle is clamped between the ram extensions. In this position, the caps 84 and 82 on resistance beam 16 serve as resistance means to the rightward movement of gear 320 permitting the lefthand ram and the axle 96 to pass and, thus, allows the gear 320 to be removed from its seat. The press is set in the "demount mode" to remove the gear. Thereafter, lefthand ram 50A is extended until the gear is loose. Once the gear is loose, the axle clamp is removed and the loose assembly is conveyed from the press on its slings 322.

Figure 25A:
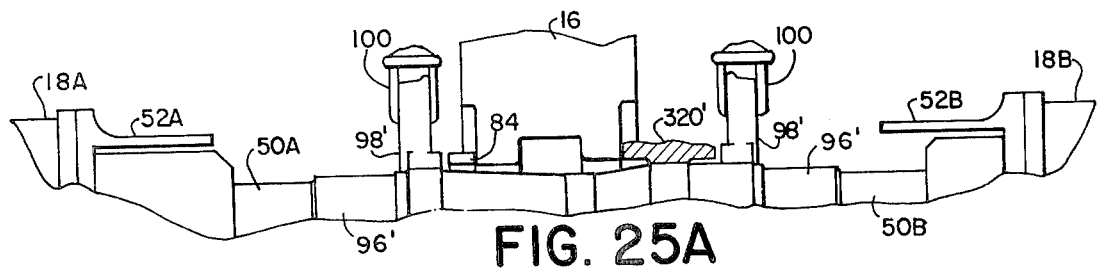
FIGS. 25A through 25F represent a schematic showing of the various steps in wheel demounting procedures for another type wheel set.
Figure 25B:
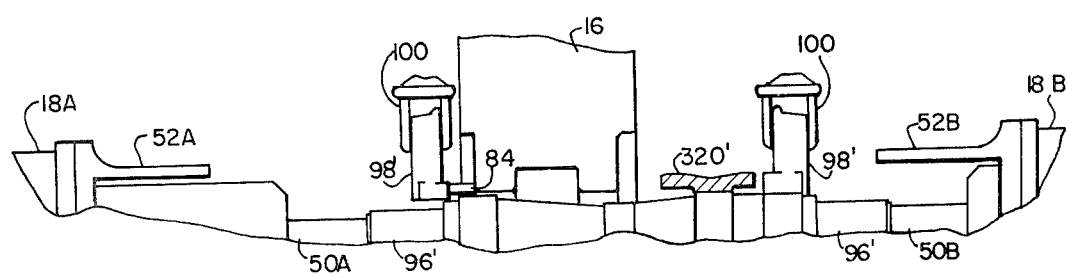
Figure 25C:
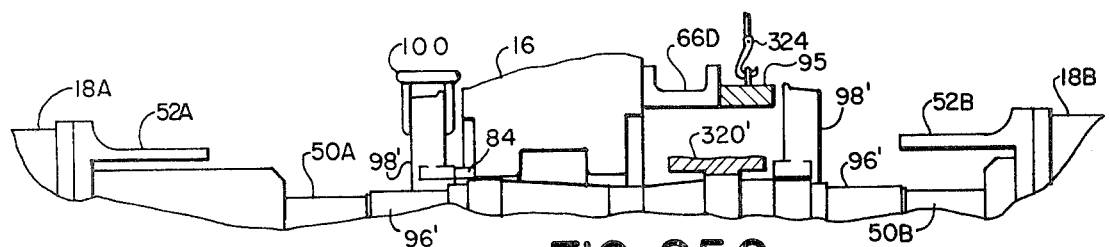
Figure 25D:
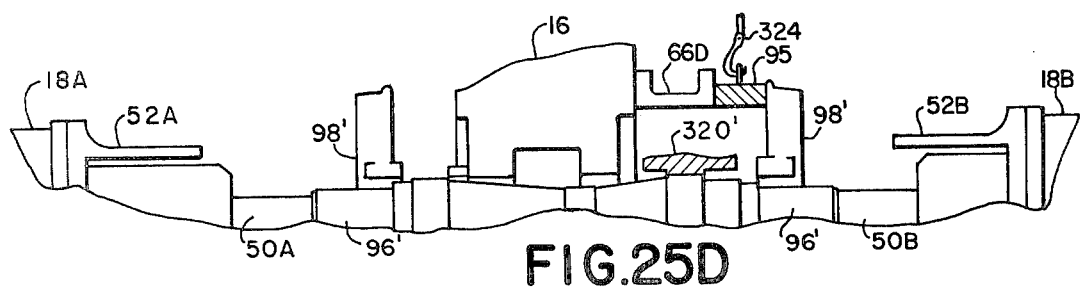
Figure 25E:
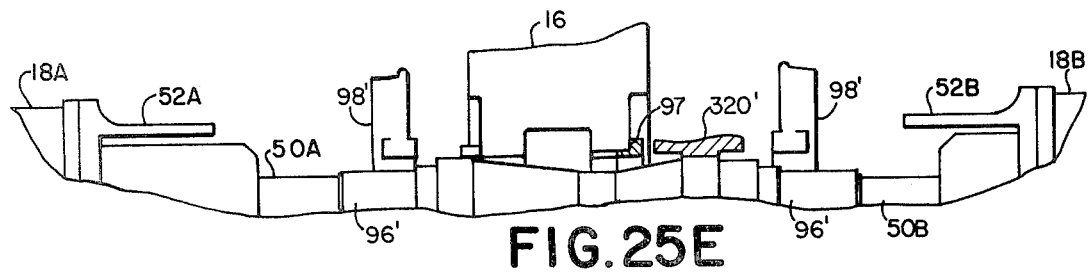
Figure 25F:
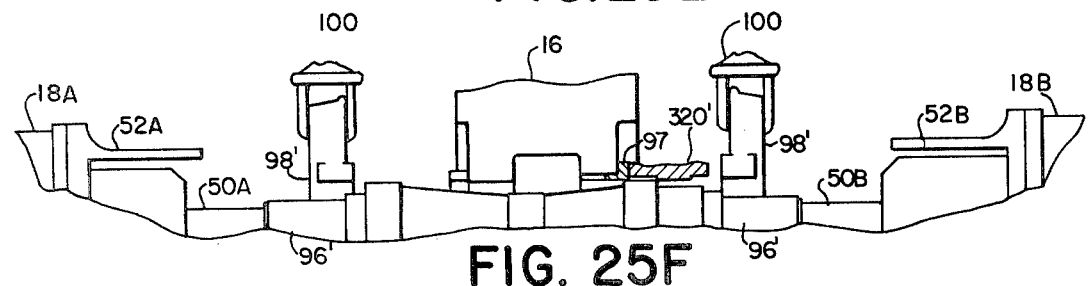

It will be understood from prior discussions, that special equipment is used in connection with the processing of so-called "hy-liner" wheel set. FIGS. 25A, 25B, 25C, 25D, 25E, 25F show the demounting procedure with hy-liner wheel sets. As shown in FIG. 25A, the hy-liner wheel set is moved to the center line of the press using the same crane handling procedures despite somewhat different dimensions of the wheels 98' and axle 96'. The rams are then extended and clamp the axle between the ram extensins as in the other processes. As shown in FIG. 25B, the lefthand ram 50A is extended moving axle 96' to the right until the lefthand wheel 98' is moved against the caps 84 and 82 of resistance beam 16 which cause the wheel to be held stationary as the axle moves further to the right. Once the wheel is loose, the demounting yoke unit 66D is moved into the position shown in FIG. 25C. Because of the special dimensional problems concerned with the gear, the yoke 95 shown in FIGS. 10A and 10B, is moved into position using a hook 324 on one of the hoists and suspended in this position. Then, as shown in FIG. 25D, the righthand ram is extended moving axle 96' to the left and causing the rim of the righthand wheel 98' to bear against the yoke 95. Yoke 95, through yoke unit 66D and resistance beam 16 hold the wheel 98' in position as the axle 96' is moved to the left until the wheel 98' is loose. Next, resistance beam cap 97 (shown in FIGS. 11A and 11B) is inserted into resistance beam 16 as shown in FIG. 25E following extension of the lefthand ram far enough to remove the demounting yoke 95 and to substitute the resistance beam cap 97. Then, as shown in FIG. 25F, the righthand ram 50B is extended until the gear unit 320' is loose from its seat on the axle. Thereafter the lefthand ram 50A is extended, moving the axle 96' to the right enough to remove the resistance beam cap 97. The loose wheels 98' are reengaged by the crane, released from the axle clamp of the rams and may be conveyed away by the hoist.

Figure 26A:
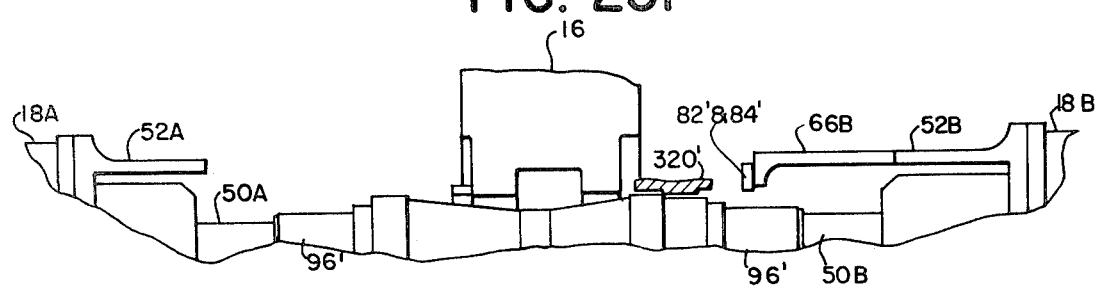
FIGS. 26A through 26F show schematically the various steps of wheel mounting procedure for the wheel set of FIGS. 25A–25F.
Figure 26B:
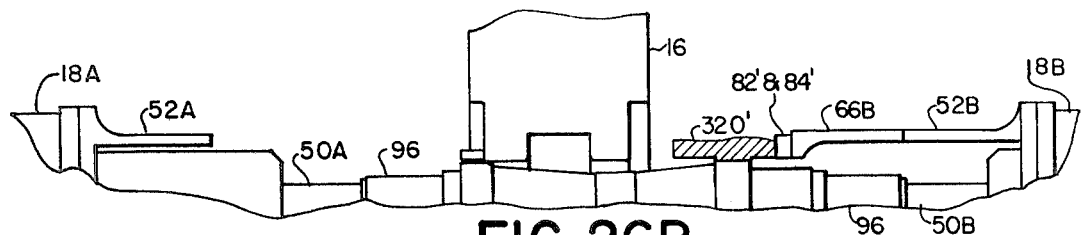

When the reverse procedure is required and the hy-liner gear and wheels are to be mounted, the procedure shown in FIGS. 26A, 26B, 26C, 26D, 26E and 26F is employed. First, the axle is conveyed to the press using the nylon slings; then clamped in position as shown in FIG. 26A with the loose gear 320' in place. The rams are extended and the axle 96' is clamped between the ram extensions. Thereafter, the righthand pivoting yoke 66B is moved into the position shown in FIG. 26B. Yoke 66B has a hardened steel rim aligned to resist axial movement of gear 320'. The lefthand ram 50A is then extended to the right as shown in FIG. 26B, until the gear is mounted by pressing the axle through while the gear is held against yoke 66B through caps 82' and 84'. The ram extension 50A is then retracted and the mounting yoke 66B is removed. The slings are repositioned on the axle, the axle clamp is removed and the axle conveyed from the press.

Figure 26C:
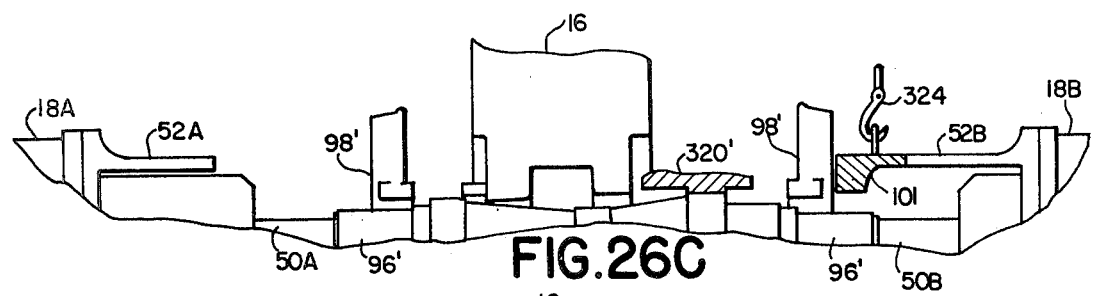
Figure 26D:
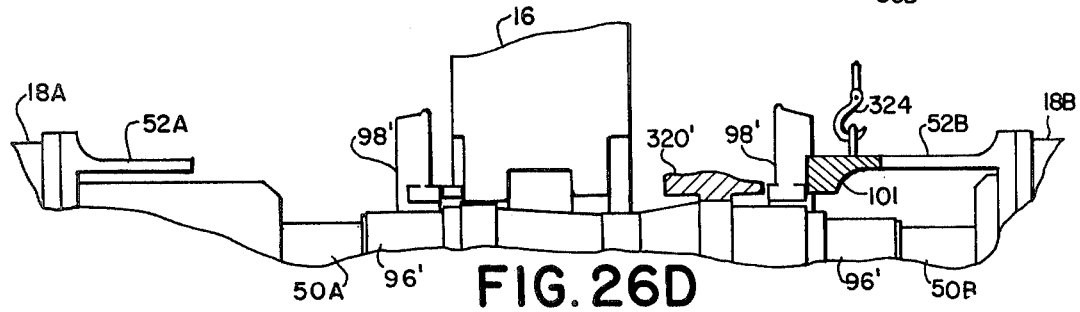
Figure 26E:
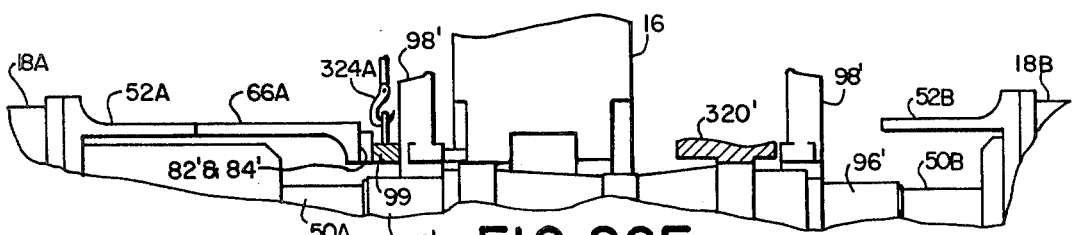
Figure 26F:
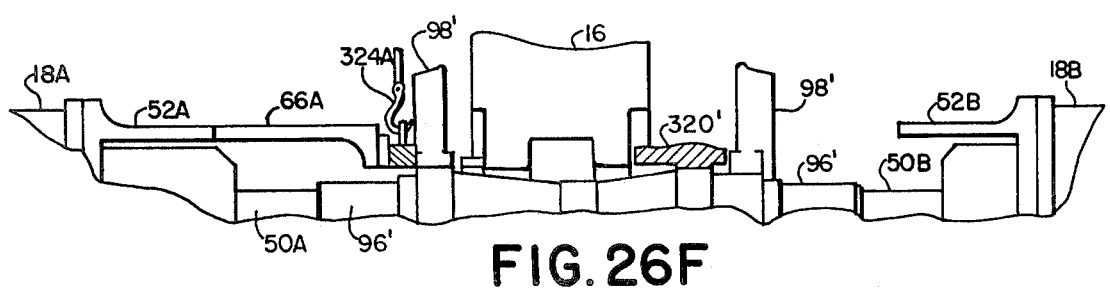

Thereafter, the wheels are loosely assembled onto the axle and the loose assembly is carried back to the center line of the press. The axle is reclamped as shown in FIG. 26C. At this point, mounting yoke 101, shown in FIGS. 13A and 13B, is moved into position using hook 324 on the crane hoist. Thereafter, the lefthand ram 50A is extended until the righthand wheel is seated against mounting yoke 101 which bears against stationary yoke 52B on cylinder 18B. The lefthand ram is extended until the righthand wheel is seated as seen in FIG. 26D. Thereafter the righthand ram is extended enough to permit removal of the yoke 101. At this point, as shown in FIG. 26E C-yoke 99, illustrated in FIGS. 12A and 12B, is inserted using a hoist hook 324A following the positioning of pivoting yoke 66A and its hardened rim caps 82' and 84' into position shown. The righthand ram is then extended as shown in FIG. 26E until the lefthand wheel is seated against yoke 99 and held against further movement as the righthand ram is further extended to seat the lefthand wheel 98'. Thereafter, the lefthand ram is extended far enough to allow removal of the C-yoke 99 and the pivoting yoke 66A. The wheels 98' are then hitched to the hoist using wheel clamps 100 and the wheel set is removed from the press after the axle clamp is released. It should be noted that the recording guage was energized each time a wheel was mounted.

FIGS. 27A through 27G and FIGS. 28A through 28J relate to still another type of wheels having bearings to be pressed on, this time for the diesel wheel set. The introduction of the special bearing mounting and demounting introduces yet another set of steps to the previously enumerated procedures. The demounting procedures will be considered first and then the mounting procedures.

Figure 27A:
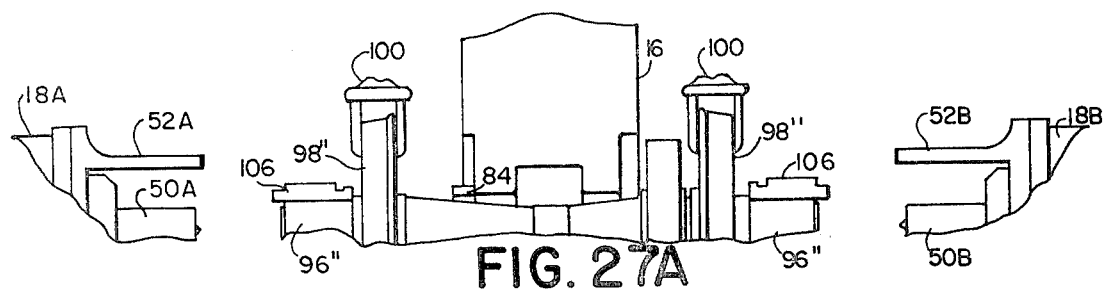
FIGS. 27A through 27G represent the steps in demounting procedure for wheels and bearings in a diesel wheel set.
Figure 27B:
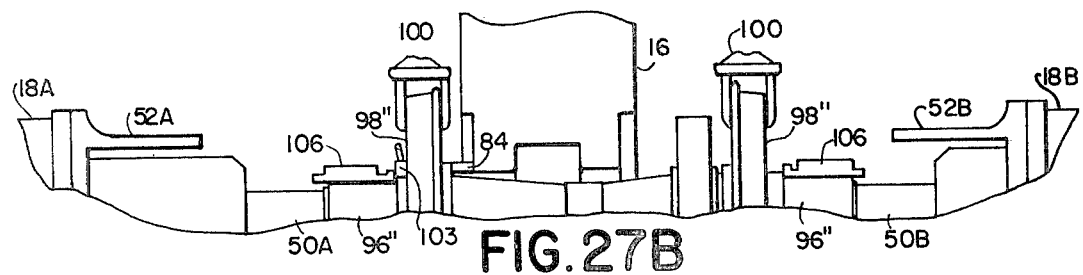
Figure 27C:
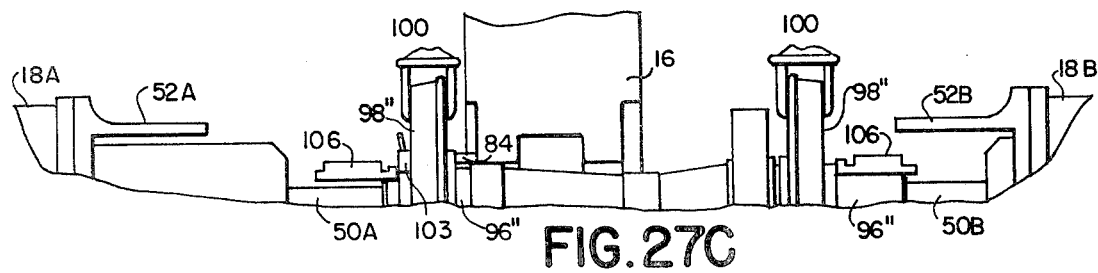
Figure 27D:
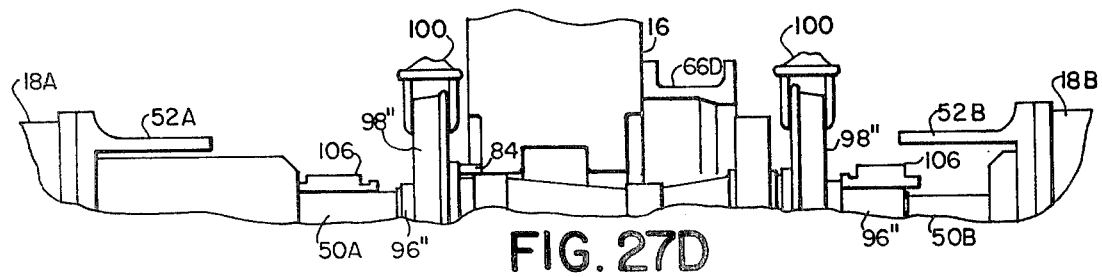
Figure 27E:
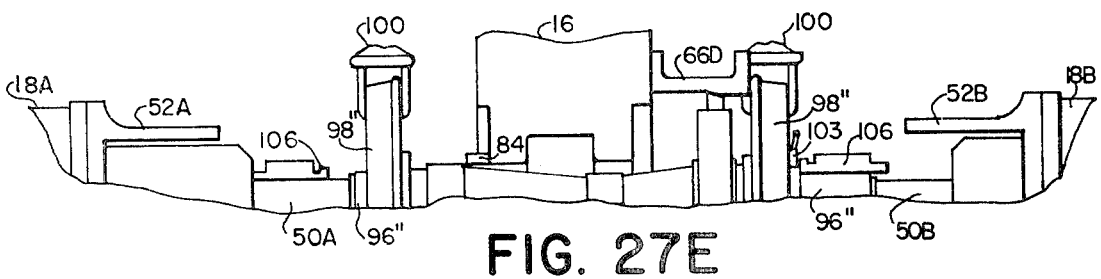
Figure 27F:
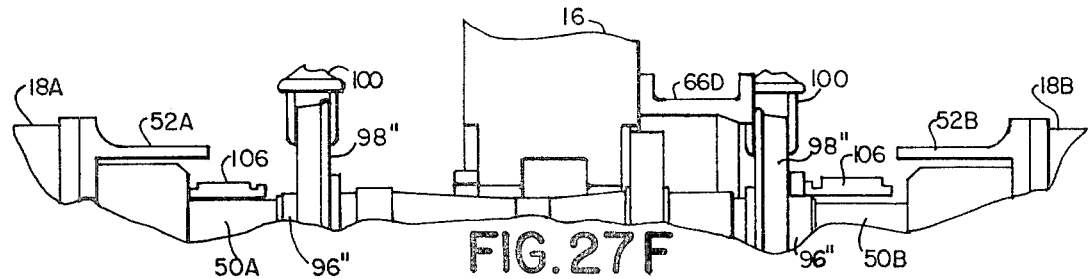
Figure 27G:
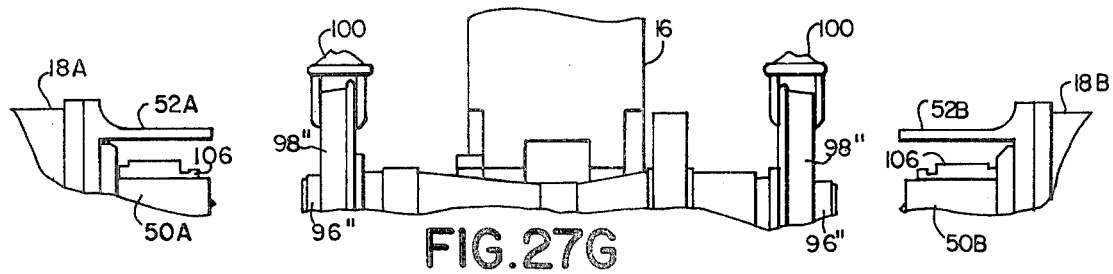

Referring first to FIGS. 27A, 27B, 27C, 27D, 27E, 27F, 27G, the system retains the same numbering except that the wheels are now designated 98" and the axle 96". FIG. 27A shows the rigid assembly conveyed to the center line of the press as in connection with previous descriptions. FIGS. 27B shows both of the rams extended to engage the axle end faces so that "axle clamp" is applied. At this stage, a bearing demounting collar 103 shown in FIG. 14 is moved into position between bearing 106 and hub of lefthand wheel 98" using the crane or by hand. As shown in FIG. 27C the lefthand ram is extended, moving the axle 96" to the right, until both wheel and bearing are loosened due to abutment against caps 84 and 82. Then, as seen in FIG. 27D, lefthand bearing 106 is slid onto the axle extension of the ram 50A. The demounting yoke 66D is moved into active position as shown in FIG. 27D. Then, the bearing demounting collar 103 is moved to the righthand side between the hub of wheel 98" and the and the bearing 106 as shown in FIG. 27E. The righthand ram 50B is extended until the rim of the wheel abuts demounting yoke 66D as shown in FIG. 27E. The lefthand ram is extended further urging the axle further until both the wheel and the bearing are free from the axle. The righthand bearing is slid onto the ram extension 50B. The demounting yoke is removed to a clear position. Thereafter, the axle is recentered. Finally, as shown in FIG. 27G, the rams are retracted leaving the axle and loose assembly supported on the hoist wheels clamps 100 to be conveyed away by the crane.

Figure 28A:
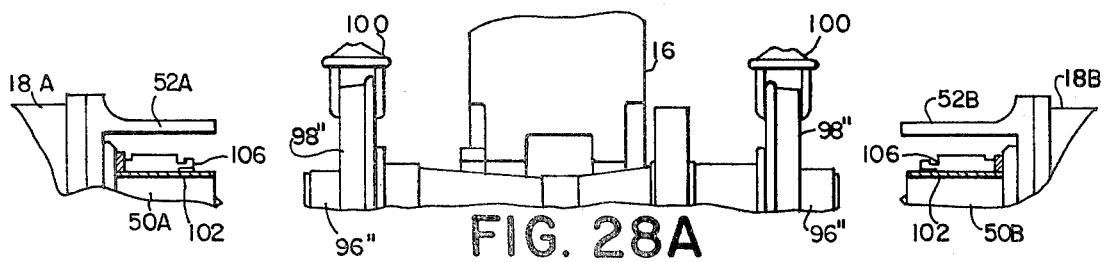
FIGS. 28A through 28J represent the steps in mounting procedure for wheels and bearings in a diesel wheel set.
Figure 28B:
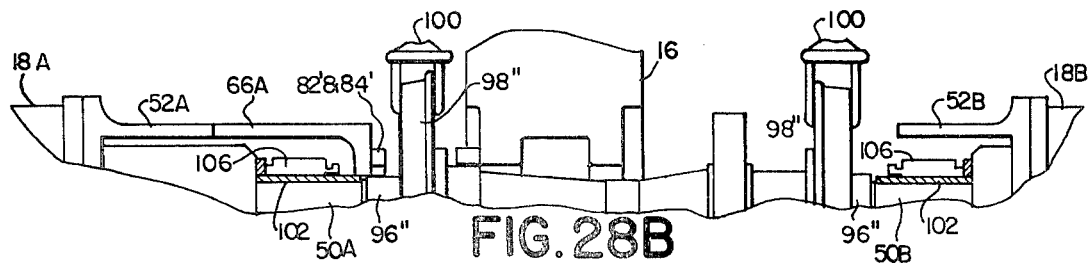
Figure 28C:
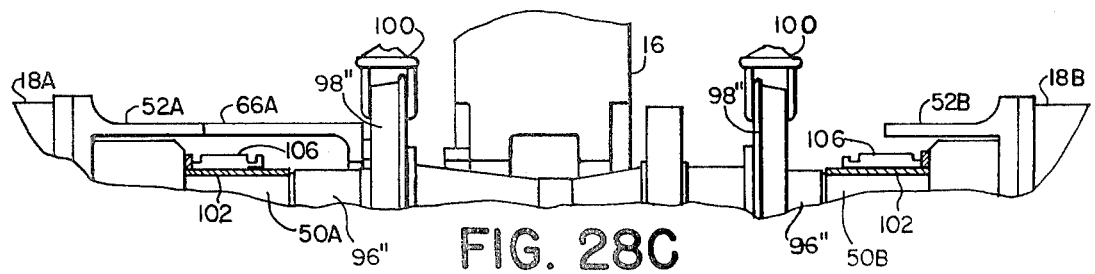
Figure 28D:
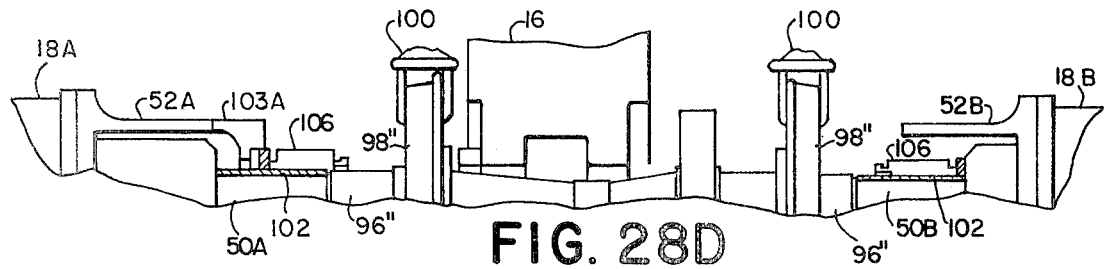
Figure 28E:
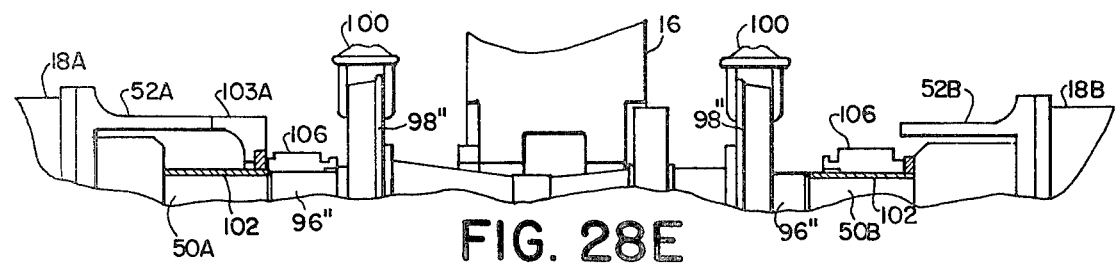
Figure 28F:
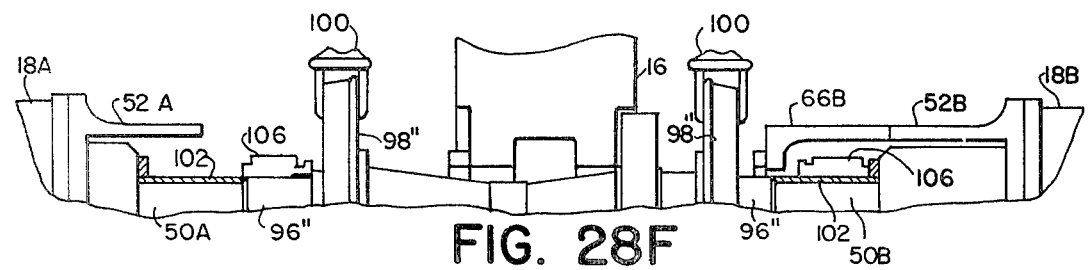
Figure 28G:
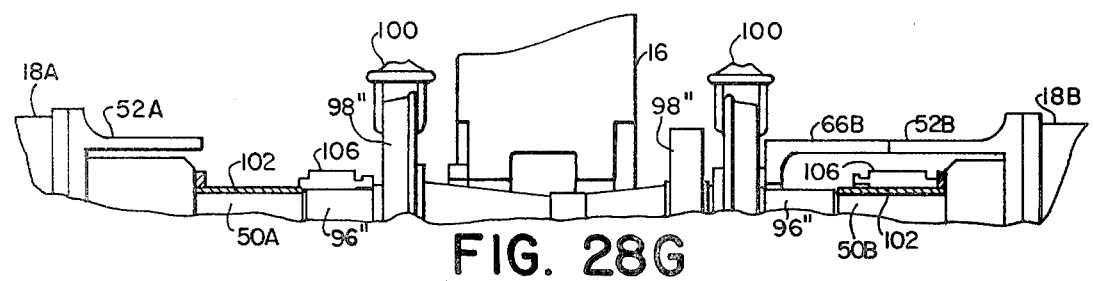
Figure 28H:
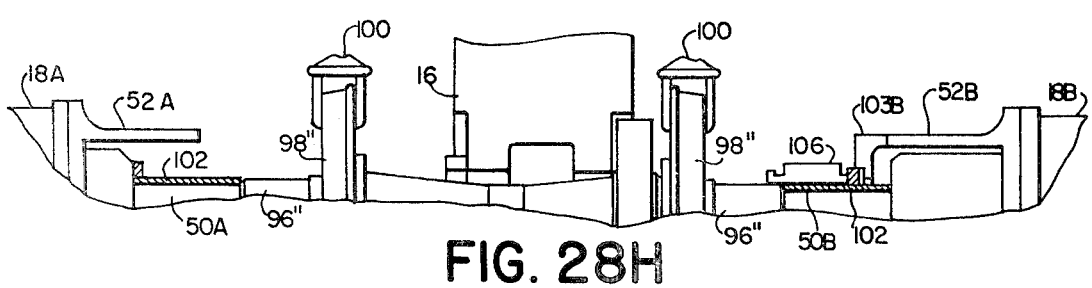
Figure 28I:
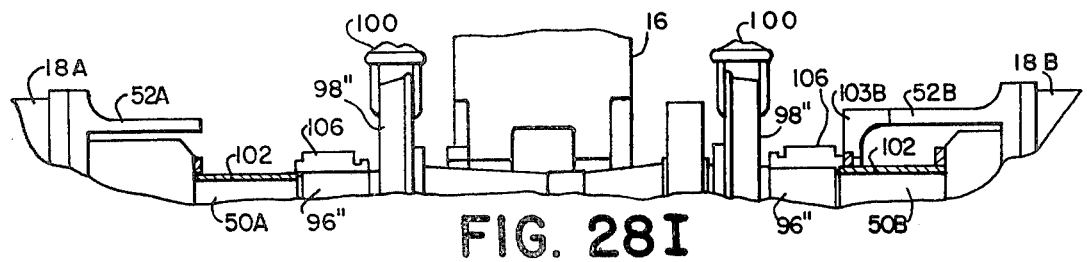
Figure 28J:
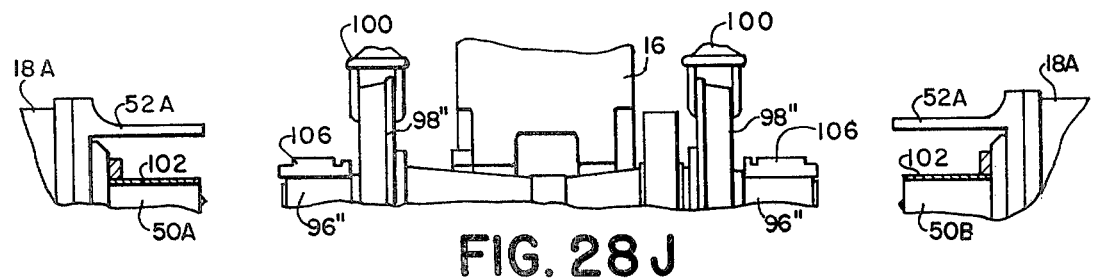

Finally, the mounting procedure for wheels and bearings of the diesel wheel set is shown in FIGS. 28A, 28B, 28C, 28D, 28E, 28F, 28G, 28H, 28I and 28J. As shown in FIG. 28A, the bearings are supported on the ram extensions 50A and 50B. Sleeves 102 effectively add to the diameter of the ram extensions so that they are effectively the same diameter as the bearing seat on axle 96". Therefore, the sleeves support the bearings in perfect concentricity with the axle when properly aligned. The wheels 98" are loosely supported on the axle 96' and are brought into center line position using the wheel clamps 100 on the hoists of the overhead crane as shown in FIG. 28A. Then, as shown in FIG. 28B, each ram is extended to engage the axle end faces and "axle clamp" is applied. Thereafter the lefthand ram is extended somewhat to move the structure out of the way to permit the placement of pivoting yoke 66A into position as shown. The press is directed into a mounting mode. Thereafter, as shown in FIG. 28C, the righthand ram is extended until the lefthand wheel abuting against the hardened caps 82' and 84' of the yoke 66A is seated as the axle moves further to the left. The lefthand ram is extended to permit the pivoting yoke 66A to be moved into clear position. The bearing is then manually pushed until it starts onto the axle and a bearing mounting yoke 103A is substituted for yoke 66A as shown in FIG. 28D. When the bearing mount yoke is in active position, the press is directed to "bearing mount" mode. Then, as shown in FIG. 28E, the righthand ram is extended until the bearing is seated. Once seated, the lefthand ram is extended and the press is directed to "mount" mode. The lefthand bearing mounting yoke is moved to clear position. Thereafter, the righthand ram is extended moving the axle to the left and the righthand pivoting yoke 66B is moved into position as shown in FIG. 28F. Once pivoting yoke 66B is in position, the lefthand ram is extended until the righthand wheel is seated as shown in FIG. 28G. Thereafter, the lefthand ram is extended and the pivoting yoke 66B is moved clear. The bearing is manually moved until it starts onto the axle and the bearing mounting yoke 103B as shown in FIG. 28H is moved into position. The press is then directed to "bearing mounting" mode, following which the lefthand ram is extended until the righthand bearing is seated as shown in FIG. 28I. Thereafter the axle is recentered to the position shown in FIG. 28J. The mounting yoke 103B is removed to a clear position. The axle clamp is removed and both rams are retracted. The rigid assembly is then conveyed from the press.

It will be appreciated that certain specific processes used with the press have been described. These are preferred uses of a press for known applications, but other uses of the press will occur to those skilled in the art. Furthermore, the press itself and the various attachments are also subject to modification and variation as needed in accordance with various modified structures to be handled and procedures to be followed. The present invention is directed to all such modifications within the scope of the claims and each of them is intended to be within the scope and spirit of the present invention.

We claim:

1. A pressure sensing gauge system for a hydraulic press having opposed fluid actuated rams within cylinders, comprising:
    pressure transmitting lines from the ram driving end of each of the cylinders,
    a valve positionable to cause connection of the lines such that the high pressure will always be connected to a fixed output port,
    means determining the position of the valve in accordance with pressure conditioning in the system,
    a differential pressure cylinder having a piston having at least an output piston rod,
    lines connecting the high and low pressure output ports to opposite sides of the piston in said differential cylinder,
    a differential pump constructed to generate a pressure proportional to the thrust of the differential cylinder's piston rod, and
    pressure indicator connected to the output of the differential pump and responding to indicate the differential pressure.

2. The pressure sensing gauge system of claim 1 in which the pressure indicator includes a pressure recording gauge which is driven in one direction by the output pressure of the differential pump and in another by linear ram motion.

3. A drive for a linear recording pressure gauge responding to linear movement in either direction of one of the rams including:
    a linear flexible connector connected between said ram and a fixed position,
    path defining means for the linear connector including at least a direction changing element affixed to the frame and slack storage means for the linear connector between the fixed position and a pulley means to keep the linear connector taut, a linear movement monitoring device along said path in contact with and driven by the linear connector between the connection to the ram and the direction changing element, said device including separate rotary elements driven by a linear member through separate directional clutch means which are responsive to transmit motion only in one direction, the clutches respectively, transmitting motion in opposite directions, a recording gauge having one directional drive member responsive to said separate rotary elements with a direction changing means between one of the rotary means and the directional drive member whereby each of the rotary elements drives the recording gauge in the same direction, and means to disengage the driving connection except for times selected for recording.

* * * * *

UNITED STATES PATENT AND TRADEMARK OFFICE
CERTIFICATE OF CORRECTION

PATENT NO. : 4,254,663

DATED : March 10, 1981

INVENTOR(S) : Jack A. Rickrode and Charles W. Frame

It is certified that error appears in the above-identified patent and that said Letters Patent are hereby corrected as shown below:

Column 1, line 18, "ane" should be --and--.

Column 2, line 32, "conbination" should be --combination--;

line 45, "accomodated" should be --accommodated--;

line 61, "reliev" should be --relieve--.

Column 3, lines 1 and 2, "exclusivelly" should be --exclusively--;

line 10, "reetracting" should be --retracting--;

line 12, "repressents" should be --represents--;

line 19, "guage" should be --gauge--.

UNITED STATES PATENT AND TRADEMARK OFFICE
CERTIFICATE OF CORRECTION

PATENT NO. : 4,254,663
DATED : March 10, 1981
INVENTOR(S) : Jack A. Rickrode and Charles W. Frame It is certified that error appears in the above-identified patent and that said Letters Patent are hereby corrected as shown below:

Column 4, line 28, "th" should be --the--;
         line 39, "rotatary" should be --rotary--;
         line 57, "spoool" should be --spool--.
Column 6, line 1, "stantionary" should be --stationary--.
Column 11, line 58, "Alligned" should be --aligned--.
Column 18, line 4, "cuasing" should be --causing--.
Column 19, line 67, "extensins" should be --extensions--.
Column 21, line 30, delete "and the".

Signed and Sealed this

Eleventh Day of August 1981

[SEAL]

Attest:

GERALD J. MOSSINGHOFF

*Attesting Officer*       *Commissioner of Patents and Trademarks*